US012700537B2

(12) United States Patent
Shibuya et al.

(10) Patent No.: US 12,700,537 B2
(45) Date of Patent: Aug. 4, 2026

(54) ELECTRONIC COMPONENT

(71) Applicant: TDK CORPORATION, Tokyo (JP)

(72) Inventors: Keigo Shibuya, Tokyo (JP); Yuta Ashida, Tokyo (JP); Misako Kudo, Tokyo (JP); Tatsuya Koyama, Tokyo (JP); Ryosuke Komatsu, Tokyo (JP); Masahiro Tatematsu, Tokyo (JP)

(73) Assignee: TDK CORPORATION, Tokyo (JP)

( * ) Notice: Subject to any disclaimer, the term of this patent is extended or adjusted under 35 U.S.C. 154(b) by 161 days.

(21) Appl. No.: 18/405,482

(22) Filed: Jan. 5, 2024

(65) Prior Publication Data

US 2024/0312701 A1     Sep. 19, 2024

(30) Foreign Application Priority Data

Mar. 17, 2023     (JP) ................................. 2023-043276

(51) Int. Cl.
| | |
|---|---|
| *H01F 27/40* | (2006.01) |
| *H01F 27/29* | (2006.01) |
| *H01G 4/30* | (2006.01) |
| *H01G 4/40* | (2006.01) |

(52) U.S. Cl.
CPC ........... *H01F 27/40* (2013.01); *H01F 27/292* (2013.01); *H01G 4/30* (2013.01); *H01G 4/40* (2013.01)

(58) Field of Classification Search
CPC ......... H01F 27/40; H01F 27/292; H01G 4/30; H01G 4/40; H03H 1/00; H03H 2001/0021
See application file for complete search history.

(56) References Cited

U.S. PATENT DOCUMENTS

| | | | | |
|---|---|---|---|---|
| 5,075,653 | A | * | 12/1991 | Ito ........................ H01P 1/20336 |
| | | | | 333/204 |
| 5,394,123 | A | * | 2/1995 | Inoue ................... H03H 9/1035 |
| | | | | 333/191 |
| 6,417,461 | B1 | * | 7/2002 | Hirahara .................. H05K 1/16 |
| | | | | 174/256 |

(Continued)

FOREIGN PATENT DOCUMENTS

| | | |
|---|---|---|
| JP | 2001-313536 A | 11/2001 |
| JP | 2017-079362 A | 4/2017 |
| WO | 2012/077498 A1 | 6/2012 |

OTHER PUBLICATIONS

Jun. 2, 2026 Office Action issued in Japanese Patent Application No. 2023-043276.

*Primary Examiner* — Muaamar Qahtan Al-Taweel
(74) *Attorney, Agent, or Firm* — Oliff PLC

(57) ABSTRACT

An electronic component includes an element body formed by laminating a plurality of insulating layers, and a resonator disposed in the element body. The resonator includes a first conductor and a second conductor extending in a stacking direction of the plurality of insulating layers, and inductor conductors electrically connecting the first conductor and the second conductor. In at least one conductor of the first conductor and the second conductor, when the conductor is viewed from the stacking direction, a first length in one direction is longer than a second length in the other direction orthogonal to the one direction, and as viewed from the stacking direction, a direction in which the first conductor and the second conductor are arranged is orthogonal to the one direction.

5 Claims, 19 Drawing Sheets

(56)            References Cited

U.S. PATENT DOCUMENTS

|              |        |          |                |
| ------------ | ------ | -------- | -------------- |
| 6,456,172 B1 * | 9/2002 | Ishizaki | H01P 1/20345 |
|              |        |          | 333/204 |
| 7,541,896 B2 * | 6/2009 | Fukunaga | H01P 1/20345 |
|              |        |          | 333/204 |
| 9,041,493 B2 * | 5/2015 | Ahn | H01P 1/20345 |
|              |        |          | 333/204 |
| 2002/0063611 A1 * | 5/2002 | Tojyo | H03H 7/09 |
|              |        |          | 333/185 |
| 2012/0062340 A1 * | 3/2012 | Huang | H03H 9/462 |
|              |        |          | 333/186 |
| 2013/0229241 A1 | 9/2013 | Imamura | |
| 2014/0043189 A1 * | 2/2014 | Lee | H01Q 9/0485 |
|              |        |          | 342/368 |

* cited by examiner

ELECTRONIC COMPONENT

TECHNICAL FIELD

The present disclosure relates to an electronic component.

BACKGROUND

An electronic component includes an element body formed by laminating a plurality of insulating layers, and a resonator disposed in the element body (see, for example, International Publication Pamphlet No. WO2012/077498). The resonator includes two conductors extending along a stacking direction of the plurality of insulating layers and a connection conductor electrically connecting the two conductors.

SUMMARY

In the resonator of the electronic component, a resistance value of the conductor is desirably lowered from the viewpoint of improving a Q value. In order to lower the resistance value of the conductor, it is necessary to increase a cross-sectional area (diameter) of the conductor. However, when the cross-sectional area of the conductor is increased while a size of the element body is maintained, a space (opening) formed by the two conductors and the connection conductor may be narrowed. In this case, since a region where a magnetic flux is generated around the conductor becomes small, it is difficult to form a magnetic field around the conductor. As a result, in the electronic component, an apparent volume of the inductor constituted by the two conductors and the connection conductor decreases, and the Q value may decrease. On the other hand, in the electronic component, in order to secure the space formed by the two conductors and the connection conductor while increasing the cross-sectional area of the conductor, it is necessary to increase the element body.

An object of an aspect of the present disclosure is to provide an electronic component capable of improving a Q value while suppressing an increase in size of an element body.

(1) An electronic component according to an aspect of the present disclosure includes an element body formed by stacking a plurality of insulating layers, and a resonator disposed in the element body. The resonator has two conductors extending in a stacking direction of the plurality of insulating layers, a connection conductor electrically connecting the two conductors, in at least one conductor of the two conductors, when the conductor is viewed from the stacking direction, a first length in one direction is longer than a second length in an other direction orthogonal to the one direction, and as viewed from the stacking direction, a direction in which the two conductors are arranged and the one direction are orthogonal.

In the electronic component according to the aspect of the present disclosure, in at least one conductor of the two conductors, a first length in one direction is longer than a second length in the other direction orthogonal to the one direction when the conductor is viewed from the stacking direction. In this configuration, since a cross-sectional area of the conductor can be increased, a resistance value of the conductor can be reduced, and a Q value can be improved. In the electronic component, as viewed from the stacking direction, a direction in which the two conductors are arranged and the one direction are orthogonal. As a result, in the electronic component, even in a case where the cross-sectional area of the conductor is increased, the space formed by the two conductors and the connection conductor can be secured without increasing the size of the element body. Thus, in the electronic component, a region where a magnetic flux is generated can be secured, and a magnetic field can be formed around the conductor. Accordingly, in the electronic component, an apparent volume of the inductor including the conductor and the connection conductor can be increased, and the Q value can be improved. As described above, in the electronic component, the Q value can be improved while the increase in size of the element body is suppressed.

(2) In the electronic component of the above (1), a plurality of recesses may be provided in a side surface of the conductor, and the plurality of recesses may be disposed to face in the other direction, and extend in the stacking direction. In this configuration, the bonding strength between the conductor and the connection conductor can be improved.

(3) In the electronic component of the above (1) or (2), in each of the two conductors, the first length may be longer than the second length. In this configuration, since the cross-sectional areas of the two conductors can be increased, the resistance values of the two conductors can be reduced. Accordingly, in the electronic component, the Q value can be further improved.

(4) In the electronic component according to any one of the above (1) to (3), the element body may have a pair of end surfaces facing each other in a first direction, a pair of principal surfaces facing each other in a second direction, and a pair of side surfaces facing each other in a third direction. A length of the element body in the first direction may be longer than a length in the second direction and a length in the third direction, the first length of the conductor may be a length in the first direction, and the second length of the conductor may be a length in the third direction. In this configuration, the conductor is disposed in the element body such that an extending direction (one direction) of the conductor is along a longitudinal direction (first direction) of the element body, and the connection conductor is disposed along a transversal direction (third direction) of the element body. Thus, in the electronic component, more (a plurality of) resonators can be disposed in a limited space in the element body as compared with a case where the extending direction of the conductor is disposed along the transversal direction (third direction) of the element body. Accordingly, in the above configuration of the electronic component, in a case where a plurality of resonators are disposed in the element body, the space in the element body can be effectively used (space efficiency can be enhanced).

(5) In the electronic component of the above (4), the connection conductor may extend in the second direction. In this configuration, in the configuration in which the extending direction (one direction) of the conductor is along the longitudinal direction (first direction) of the element body, the length of the connection conductor can be secured.

Thus, in the electronic component, the space formed by the two conductors and the connection conductor in the element body can be enlarged.

(6) In the electronic components of any one of the above (1) to (5), a plurality of the connection conductors may be connected between two conductors. As described above, in the configuration including the plurality of connection conductors, an inductance can be adjusted by increasing or decreasing the plurality of connection conductors.

According to the aspect of the present disclosure, it is possible to improve the Q value while suppressing the increase in size of the element body.

DETAILED DESCRIPTION

Hereinafter, preferred embodiments of the present invention will be described in detail with reference to the accompanying drawings. Note that the same or corresponding elements in the description of the drawings are denoted by the same reference signs, and redundant description is omitted.

First Embodiment

Figure 1:
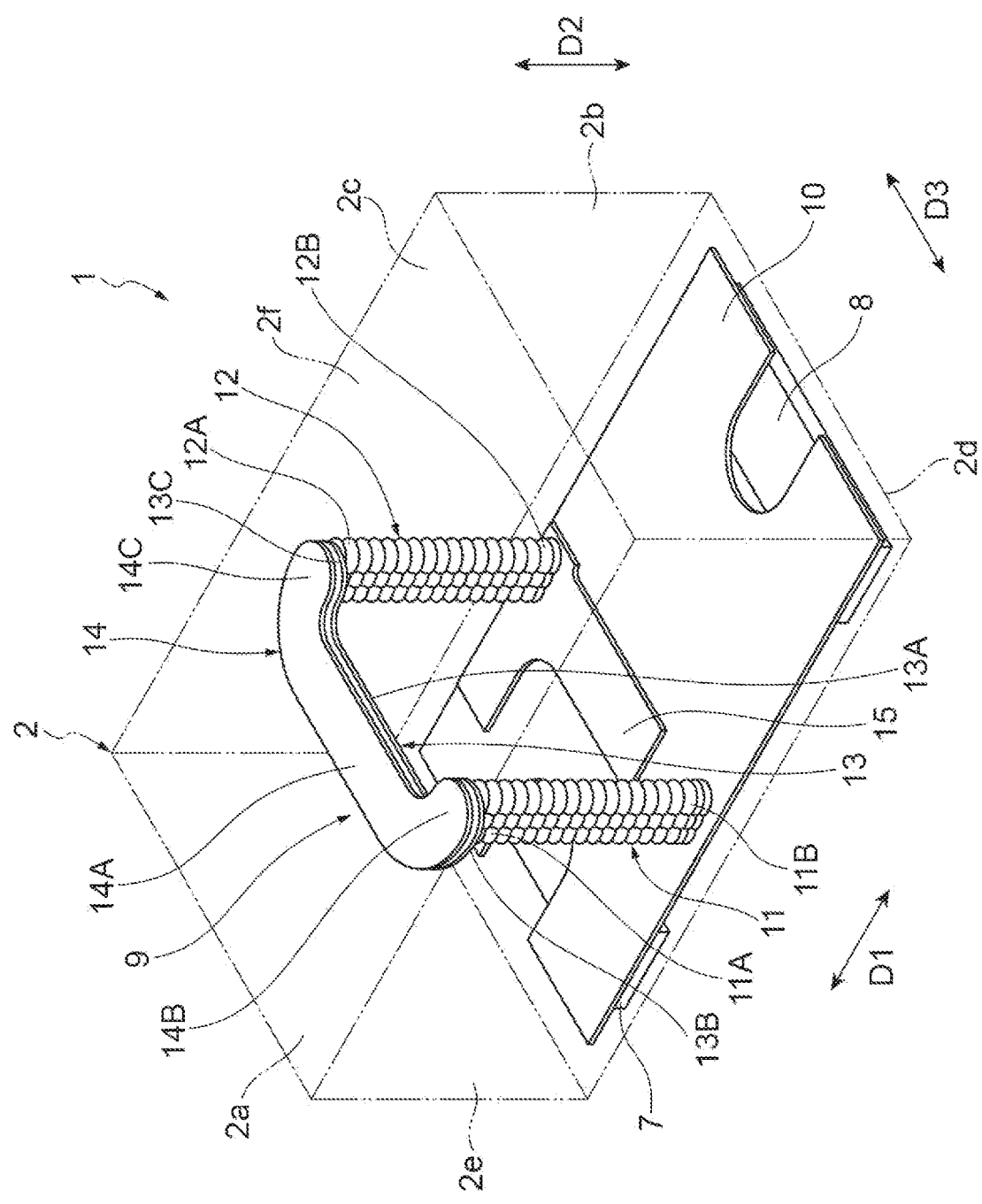
FIG. 1 is a transparent perspective view of an electronic component according to a first embodiment.
Figure 2:
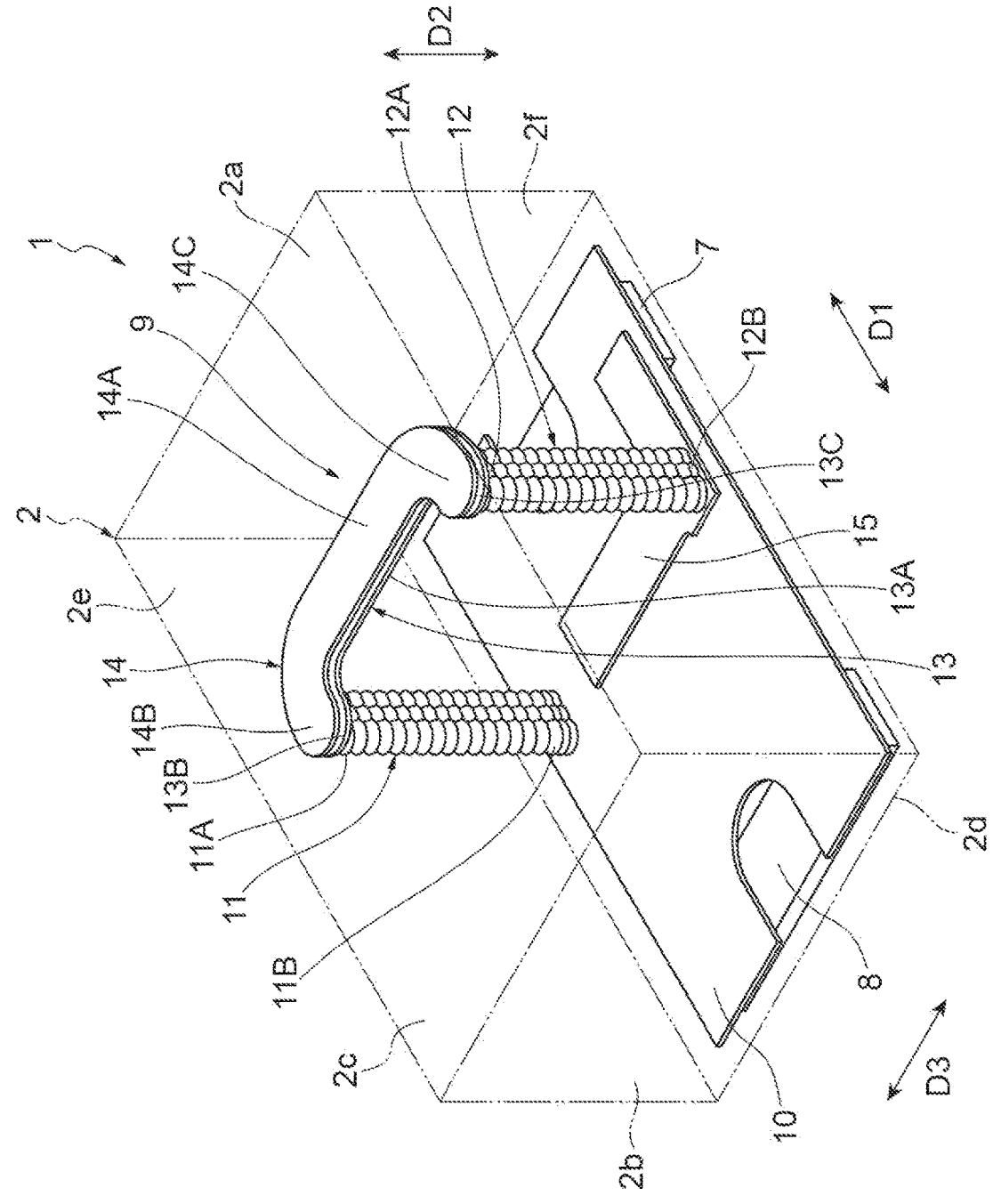
FIG. 2 is a transparent perspective view of the electronic component illustrated in FIG. 1.
Figure 3:
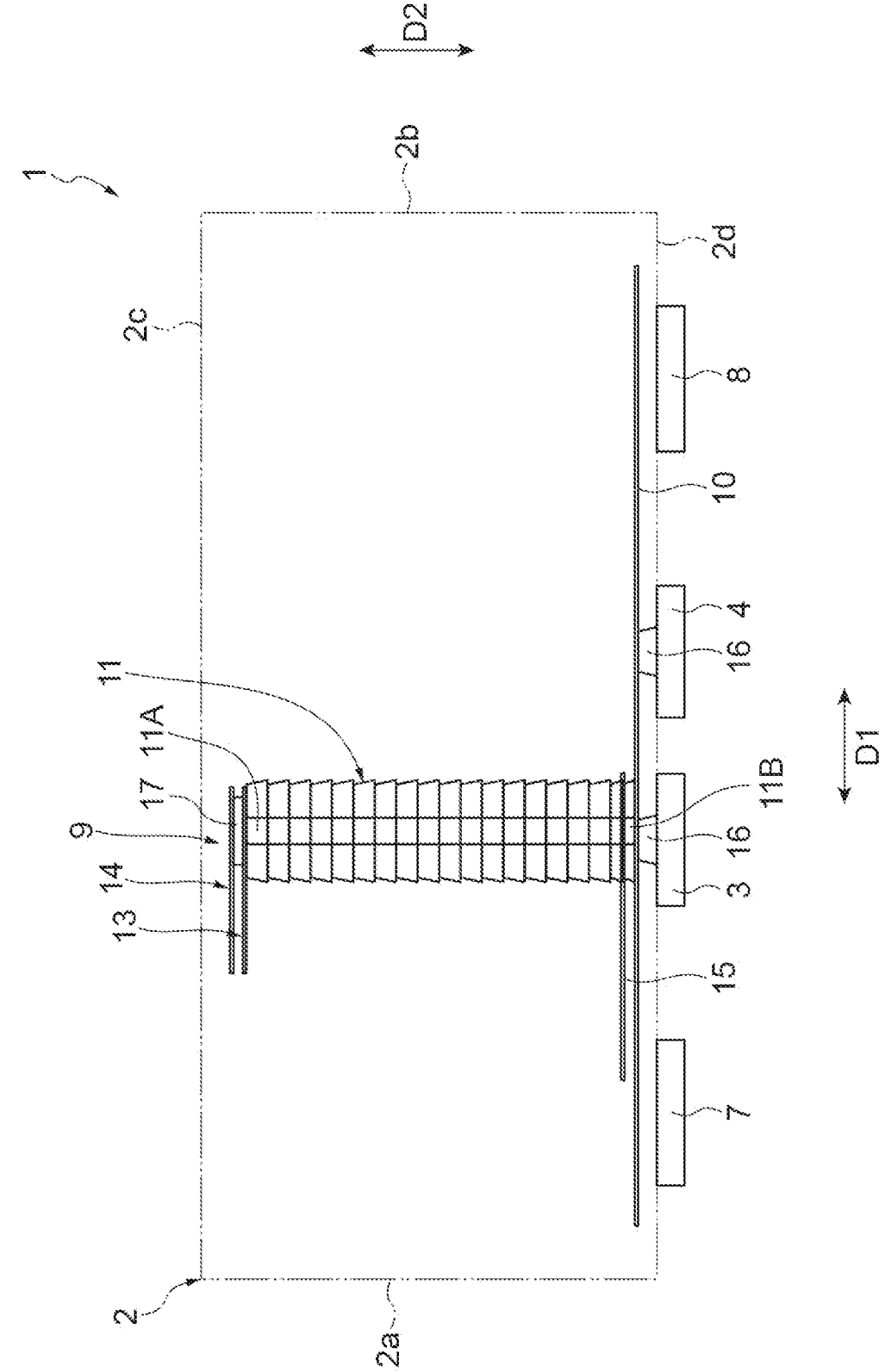
FIG. 3 is a side view of the electronic component illustrated in FIG. 1.
Figure 4:
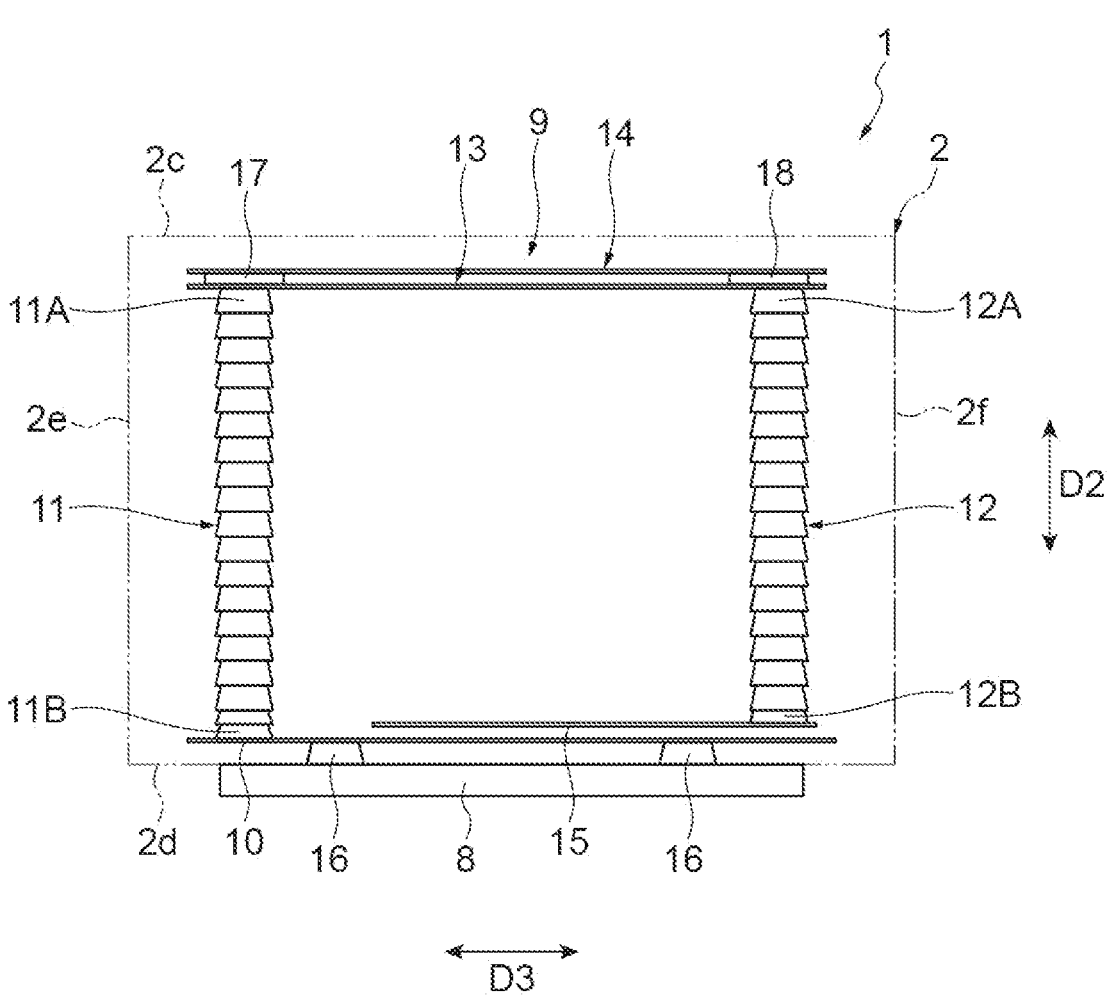
FIG. 4 is an end view of the electronic component illustrated in FIG. 1.
Figure 5:
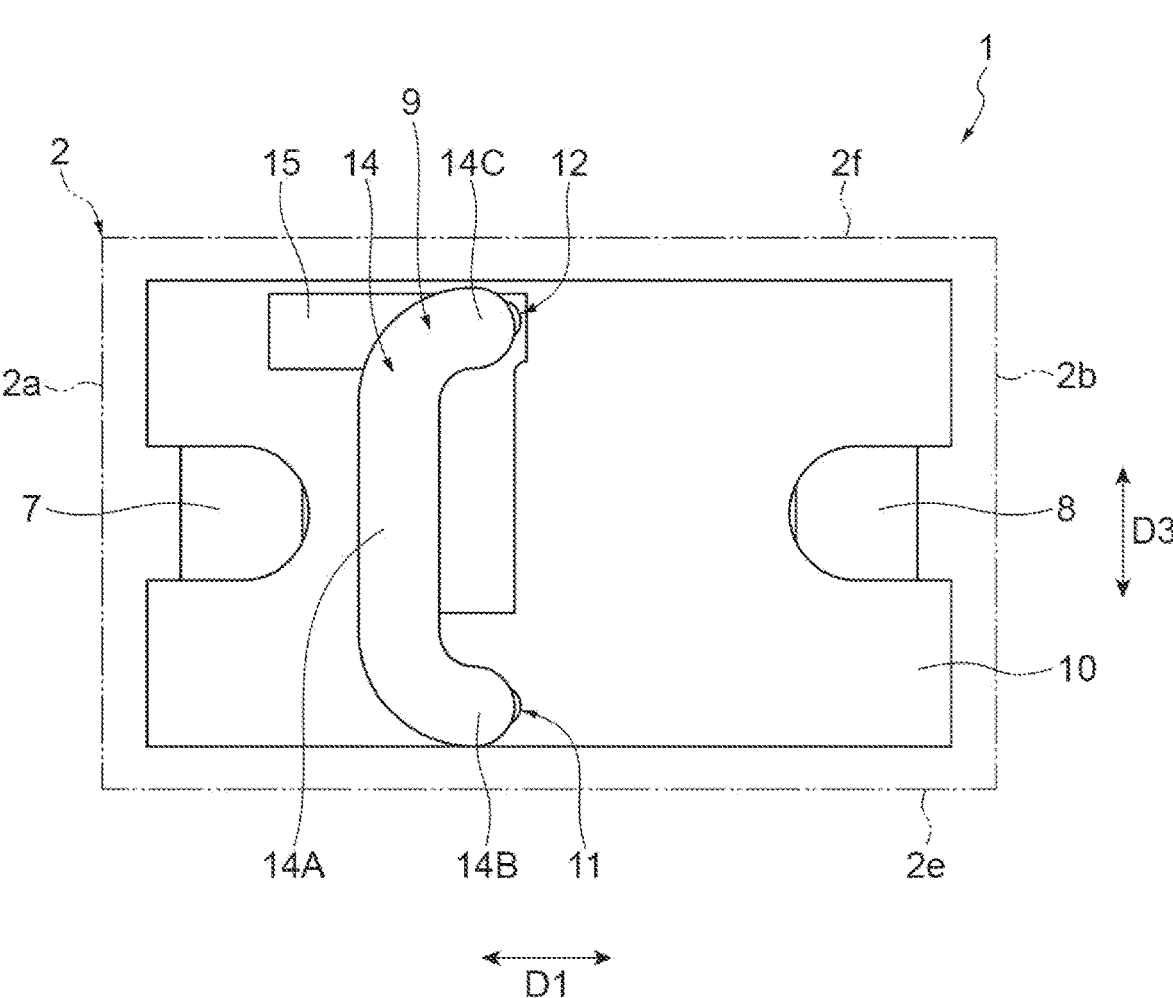
FIG. 5 is a top view of the electronic component illustrated in FIG. 1.
Figure 6:
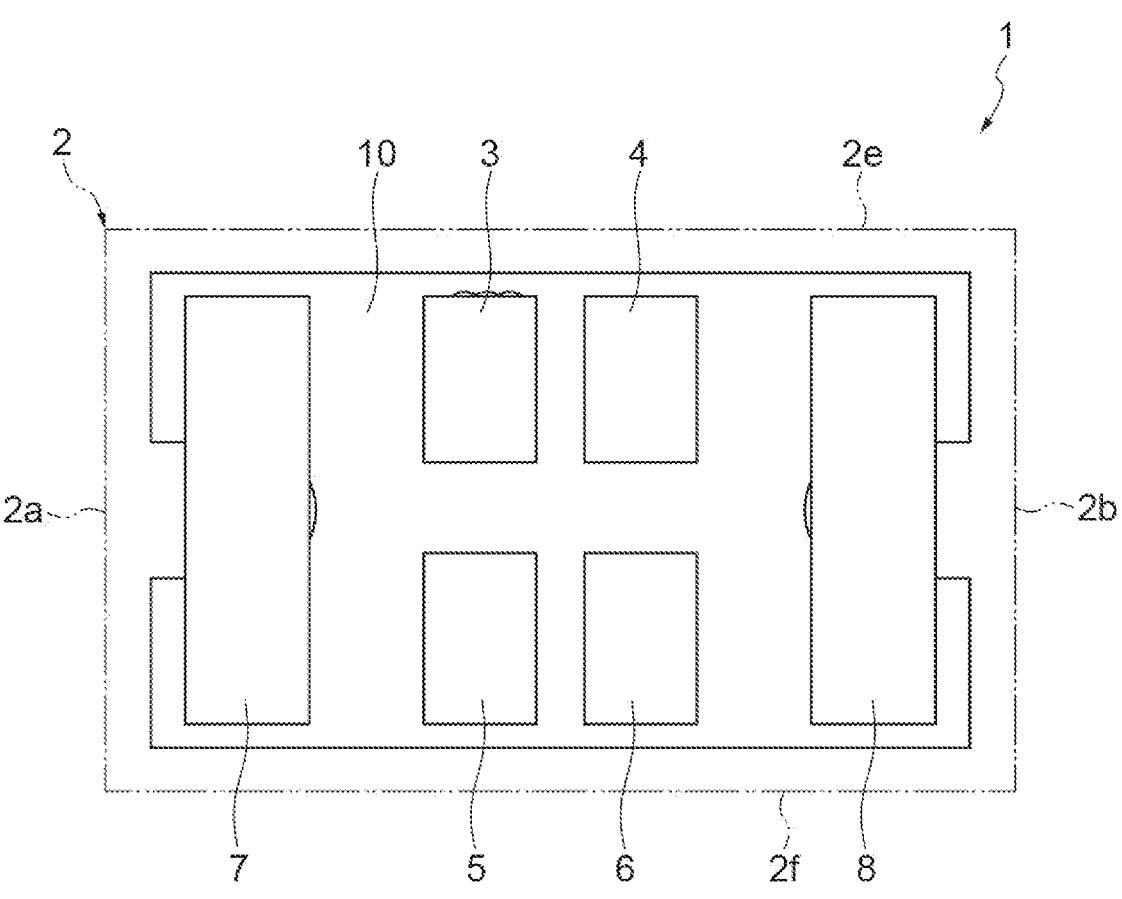
FIG. 6 is a bottom view of the electronic component illustrated in FIG. 1.

An electronic component according to a first embodiment will be described with reference to FIGS. 1, 2, 3, 4, 5, and 6. FIG. 1 is a transparent perspective view illustrating the electronic component according to the first embodiment. FIG. 2 is a transparent perspective view of the electronic component illustrated in FIG. 1. FIG. 3 is a side view of the electronic component illustrated in FIG. 1. FIG. 4 is an end view of the electronic component illustrated in FIG. 1. FIG. 5 is a top view of the electronic component illustrated in FIG. 1. FIG. 6 is a bottom view of the electronic component illustrated in FIG. 1. As illustrated in FIGS. 1 to 6, an electronic component 1 includes an element body 2, a first terminal electrode 3, a second terminal electrode 4, a third terminal electrode 5, a fourth terminal electrode 6, a fifth terminal electrode 7, a sixth terminal electrode 8, and a resonator 9. In FIGS. 1 to 6, the element body 2 is indicated by a dashed dotted line.

The element body 2 has, for example, a rectangular parallelepiped shape. The rectangular parallelepiped shape includes a rectangular parallelepiped shape in which corner portions and ridge line portions are chamfered, and a rectangular parallelepiped shape in which corner portions and ridge line portions are rounded. The element body 2 has, as outer surfaces, a pair of end surfaces 2a and 2b, a pair of principal surfaces 2c and 2d, and a pair of side surfaces 2e and 2f. The end surfaces 2a and 2b face each other. The principal surfaces 2c and 2d face each other. The side surfaces 2e and 2f face each other. Hereinafter, a facing direction of the end surfaces 2a and 2b is referred to as a first direction D1, a facing direction of the principal surfaces 2c and 2d is referred to as a second direction D2, and a facing direction of the side surfaces 2e and 2f is referred to as a third direction D3. The first direction D1, the second direction D2, and the third direction D3 are substantially orthogonal to each other.

The end surfaces 2a and 2b extend in the second direction D2 to connect the principal surfaces 2c and 2d. The end surfaces 2a and 2b also extend in the third direction D3 to connect the side surfaces 2e and 2f. The principal surfaces 2c and 2d extend in the first direction D1 to connect the end surfaces 2a and 2b. The principal surfaces 2c and 2d also extend in the third direction D3 to connect the side surfaces 2e and 2f. The side surfaces 2e and 2f extend in the first direction D1 to connect the end surfaces 2a and 2b. The side surfaces 2e and 2f also extend in the second direction D2 to connect the principal surfaces 2c and 2d.

The principal surface 2d is an implementation surface, for example, a surface facing another electronic device (for example, circuit substrate or multilayer electronic component) when the electronic component 1 is implemented on the other electronic device (not illustrated). The end surfaces 2a and 2b are surfaces continuous from the implementation surface (that is, principal surface 2d).

A length of the element body 2 in the first direction D1 is longer than a length of the element body 2 in the second direction D2 and a length of the element body 2 in the third direction D3. The length of the element body 2 in the second direction D2 is shorter than the length of the element body 2 in the third direction D3. That is, in the present embodiment, the end surfaces 2a and 2b, the principal surfaces 2c and 2d, and the side surfaces 2e and 2f have a rectangular shape. The length of the element body 2 in the second direction D2 may be equal to the length of the element body 2 in the third direction D3, or may be longer than the length of the element body 2 in the third direction D3.

In the present embodiment, "equal" may be equal to a value including a slight difference or a manufacturing error in a preset range in addition to being equal. For example, when a plurality of values are included within a range of ±5% of an average value of the plurality of values, the plurality of values are defined to be equal.

The element body 2 is formed by laminating a plurality of element body layers (insulating layers) (not illustrated) in the second direction D2. That is, the stacking direction of the element body 2 is the second direction D2. In the actual element body 2, the plurality of element body layers may be integrated to such an extent that boundaries between the layers cannot be visually recognized, or may be integrated such that boundaries between the layers can be visually recognized.

The element body layer is formed by using, for example, a sintered body of a ceramic green sheet containing a dielectric material. The dielectric material includes, for example, at least one selected from a $BaTiO_3$ based material, a $Ba(Ti, Zr)O_3$ based material, a $(Ba, Ca)TiO_3$ based material, a glass material, or an alumina material.

As illustrated in FIG. 6, each of the first terminal electrode 3, the second terminal electrode 4, the third terminal electrode 5, the fourth terminal electrode 6, the fifth terminal electrode 7, and the sixth terminal electrode 8 is provided on the element body 2. Each of the first terminal electrode 3, the second terminal electrode 4, the third terminal electrode 5, the fourth terminal electrode 6, the fifth terminal electrode 7, and the sixth terminal electrode 8 is disposed on the principal surface 2d of the element body 2. Each of the first terminal electrode 3, the second terminal electrode 4, the third terminal electrode 5, the fourth terminal electrode 6, the fifth terminal electrode 7, and the sixth terminal electrode 8 has a rectangular shape (quadrilateral shape). Each of the first terminal electrode 3, the second terminal electrode 4, the third terminal electrode 5, the fourth terminal electrode 6, the fifth terminal electrode 7, and the sixth terminal electrode 8 is disposed such that each side extends along the first direction D1 or the third direction D3. Lengths of the fifth terminal electrode 7 and the sixth terminal electrode 8 in the third direction D3 are longer than lengths of the first terminal electrode 3, the second terminal electrode 4, the third terminal electrode 5, and the fourth terminal electrode 6 in the third direction D3.

The first terminal electrode 3, the second terminal electrode 4, the third terminal electrode 5, and the fourth terminal electrode 6 are disposed at positions close to a center of the principal surface 2d. The first terminal electrode 3 and the second terminal electrode 4 are disposed apart from each other in the first direction D1. The third terminal electrode 5 and the fourth terminal electrode 6 are disposed apart from each other in the first direction D1. The first terminal electrode 3 and the third terminal electrode 5 are disposed apart from each other in the third direction D3. The second terminal electrode 4 and the fourth terminal electrode 6 are disposed apart from each other in the third direction D3.

The fifth terminal electrode 7 is disposed at a position close to the end surface 2a on the principal surface 2d. The sixth terminal electrode 8 is disposed at a position close to the end surface 2b on the principal surface 2d. The first terminal electrode 3, the second terminal electrode 4, the third terminal electrode 5, and the fourth terminal electrode 6 are disposed between the fifth terminal electrode 7 and the sixth terminal electrode 8 in the first direction D1.

As illustrated in FIGS. 3 and 4, the first terminal electrode 3, the second terminal electrode 4, the third terminal electrode 5, the fourth terminal electrode 6, the fifth terminal electrode 7, and the sixth terminal electrode 8 protrude from the principal surface 2d. That is, in the present embodiment, surfaces of the first terminal electrode 3, the second terminal electrode 4, the third terminal electrode 5, the fourth terminal electrode 6, the fifth terminal electrode 7, and the sixth terminal electrode 8 are not flush with the principal surface 2d. The first terminal electrode 3, the second terminal electrode 4, the third terminal electrode 5, the fourth terminal electrode 6, the fifth terminal electrode 7, and the sixth terminal electrode 8 are made of a conductive material (for example, Cu).

A plating layer (not illustrated) containing, for example, Ni, Sn, Au, or the like may be provided in each of the first terminal electrode 3, the second terminal electrode 4, the third terminal electrode 5, the fourth terminal electrode 6, the fifth terminal electrode 7, and the sixth terminal electrode 8 by electrolytic plating or electroless plating. The plating layer may include, for example, a Ni plating film containing Ni and covering the first terminal electrode 3, the second terminal electrode 4, the third terminal electrode 5, the fourth terminal electrode 6, the fifth terminal electrode 7, and the sixth terminal electrode 8, and an Au plating film containing Au and covering the Ni plating film.

The resonator 9 includes a ground conductor 10, a first conductor 11, a second conductor 12, an inductor conductor (connection conductor) 13, an inductor conductor (connection conductor) 14, and a capacitor pad 15.

The ground conductor 10 is disposed on the principal surface 2d side of the element body 2. The ground conductor 10 has a substantially H-shape as viewed from the second direction D2. The ground conductor 10 is electrically connected to the third terminal electrode 5. The ground conductor 10 is electrically connected to each of the first terminal electrode 3, the second terminal electrode 4, the third terminal electrode 5, and the fourth terminal electrode 6 by a connection conductor 16.

The first conductor 11 extends along the second direction D2. The first conductor 11 can include a plurality of via conductors. The first conductor 11 is disposed at a position close to the side surface 2e of the element body 2 at a position close to the center of the element body 2 in the first direction D1. The first conductor 11 is disposed at a position overlapping the first terminal electrode 3 as viewed from the second direction D2. The first conductor 11 has a first end portion 11A and a second end portion 11B. The first end portion 11A of the first conductor 11 is connected to the inductor conductor 13. The second end portion 11B of the first conductor 11 is connected to the ground conductor 10.

The second conductor 12 extends along the second direction D2. The second conductor 12 can include a plurality of via conductors. The second conductor 12 is disposed at a position close to the side surface 2f of the element body 2 at a position close to the center of the element body 2 in the first direction D1. The second conductor 12 is disposed at a position overlapping the third terminal electrode 5 as viewed from the second direction D2. The second conductor 12 is disposed at a position facing the first conductor 11 in the third direction D3. The first conductor 11 and the second conductor 12 are disposed apart from each other in the third direction D3. The second conductor 12 has a first end portion 12A and a second end portion 12B. The first end portion 12A of the second conductor 12 is connected to the inductor conductor 13. The second end portion 12B of the second conductor 12 is connected to the capacitor pad 15.

Figure 7:
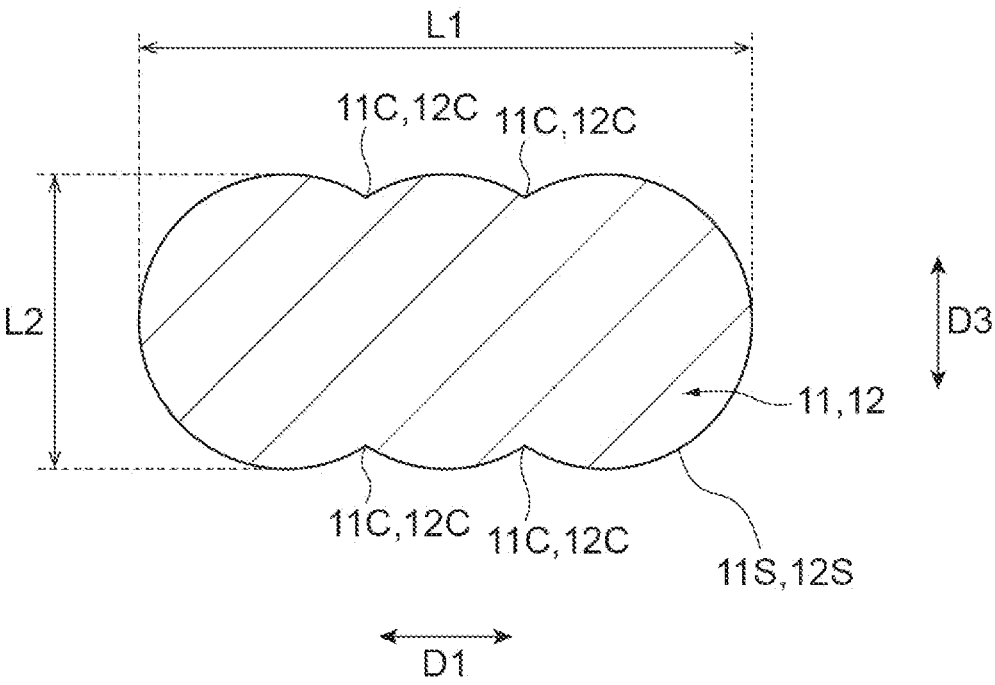
FIG. 7 is a diagram illustrating a cross-sectional configuration of a conductor.

FIG. 7 is a diagram illustrating cross-sectional configurations of the conductors (first conductor 11 and second conductor 12). Cross sections of the first conductor 11 and the second conductor 12 illustrated in FIG. 7 are cross sections of planes along the first direction D1 and the third direction D3. As illustrated in FIG. 7, the first conductor 11 and the second conductor 12 have the same shape. In the first conductor 11 and the second conductor 12, as viewed from the second direction D2, a first length L1 in the first direction D1 (one direction) is longer than a second length L2 in the third direction D3 (the other direction) (L1>L2). The first conductor 11 and the second conductor 12 are disposed such that the first length L1 is along the first direction D1 and the second length L2 is along the third direction D3. That is, an extending direction of the first conductor 11 and the second conductor 12 is orthogonal to a direction (third direction D3) in which the first conductor 11 and the second conductor 12 are arranged. A case where the extending direction is orthogonal to the direction includes a case where the extending direction is substantially orthogonal to the direction, and may include, for example, a range of about ±3°.

In the present embodiment, the first conductor 11 and the second conductor 12 have a shape in which three circles overlap. Specifically, the first conductor 11 and the second conductor 12 have a shape in which parts of a pair of adjacent circles overlap. For example, two adjacent circles overlap each other such that an outer periphery of one circle passes through a center of the other circle. Side surfaces 11S and 12S of the first conductor 11 and the second conductor 12 are curved surfaces. A plurality of recesses 11C and 12C are provided in the side surfaces 11S and 12S of the first conductor 11 and the second conductor 12. The recesses 11C and 12C extend in the second direction D2. The recesses 11C and 12 C are disposed at a predetermined interval in the first direction D1. The recesses 11C and 12C are disposed at positions facing each other in the third direction D3.

As illustrated in FIGS. 1 to 5, the inductor conductor 13 constitutes an inductor. In the present embodiment, as illustrated in FIGS. 1 and 2, the inductor conductor 13 includes a first portion 13A, a second portion 13B, and a third portion 13C. The first portion 13A, the second portion 13B, and the third portion 13C are integrally formed. The first portion 13A, the second portion 13B, and the third portion 13C have a predetermined width.

The first portion 13A extends linearly along the second direction D2. The second portion 13B is connected to an end portion of the first portion 13A on the side surface 2e side. The second portion 13B is curved. The third portion 13C is connected to an end portion of the first portion 13A on the side surface 2f side. The third portion 13C is curved. The inductor conductor 13 is bridged over the first end portion 11A of the first conductor 11 and the first end portion 12A of the second conductor 12. Specifically, the second portion 13B of the inductor conductor 13 is connected to the first end portion 11A of the first conductor 11, and the third portion 13C of the inductor conductor 13 is connected to the first end portion 12A of the second conductor 12. The inductor conductor 13 electrically connects the first conductor 11 and the second conductor 12.

The inductor conductor 14 constitutes an inductor. In the present embodiment, the inductor conductor 14 includes a first portion 14A, a second portion 14B, and a third portion 14C. The first portion 14A, the second portion 14B, and the third portion 14C are integrally formed. The first portion 14A, the second portion 14B, and the third portion 14C have a predetermined width.

The inductor conductor 14 has the same shape as the inductor conductor 13. The first portion 14A extends linearly along the second direction D2. The second portion 14B is connected to an end portion of the first portion 14A on the side surface 2e side. The second portion 14B is curved. The third portion 14C is connected to an end portion of the first portion 14A on the side surface 2f side. The inductor conductor 14 is disposed to face the inductor conductor 13 in the first direction D1.

The second portion 14B of the inductor conductor 14 is electrically connected to the second portion 13B of the inductor conductor 13 by a connection conductor 17. The third portion 14C of the inductor conductor 14 is electrically connected to the third portion 13C of the inductor conductor 13 by a connection conductor 18. The inductor conductor 14 electrically connects the first conductor 11 and the second conductor 12.

The capacitor pad 15 has a substantially L-shape as viewed from the second direction D2. The capacitor pad 15 constitutes a capacitor together with the ground conductor 10. The capacitor pad 15 is connected to the second end portion 12B of the second conductor 12. The capacitor pad 15 is disposed at a predetermined interval from the ground conductor 10 in the first direction D1.

As described above, in the electronic component 1 according to the present embodiment, the first length L1 of each of the first conductor 11 and the second conductor 12 in the first direction D1 is longer than the second length L2 in the third direction D3 as viewed from the second direction D2. In this configuration, since cross-sectional areas of the first conductor 11 and the second conductor 12 can be increased, resistance values of the first conductor 11 and the second conductor 12 can be reduced, and a Q value can be improved. In the electronic component 1, as viewed from the second direction D2, the third direction D3 in which the first conductor 11 and the second conductor 12 are arranged is orthogonal to the extending direction (first direction D1) of the first conductor 11 and the second conductor 12. As a result, in the electronic component 1, even in a case where the cross-sectional areas of the first conductor 11 and the second conductor 12 are increased, a space formed by the first conductor 11, the second conductor 12, and the inductor conductors 13 and 14 can be secured without increasing a size of the element body 2. Thus, in the electronic component 1, a region where a magnetic flux is generated can be secured, and a magnetic field can be formed around the first conductor 11 and the second conductor 12. Accordingly, in the electronic component 1, an apparent volume of the inductor including the first conductor 11, the second conductor 12, and the inductor conductors 13 and 14 can be increased, and the Q value can be improved. As described above, in the electronic component 1, the Q value can be improved while the increase in the size of the element body 2 is suppressed.

In the electronic component 1 according to the present embodiment, the plurality of recesses 11C and 12C are provided in the side surfaces 11S and 12S of the first conductor 11 and the second conductor 12. The plurality of recesses 11C and 12C are disposed to face each other in the third direction D3 and extend in the second direction D2. In this configuration, the bonding strength between the first conductor 11 and the second conductor 12 and the inductor conductor 13 can be improved.

Second Embodiment

Figure 8:
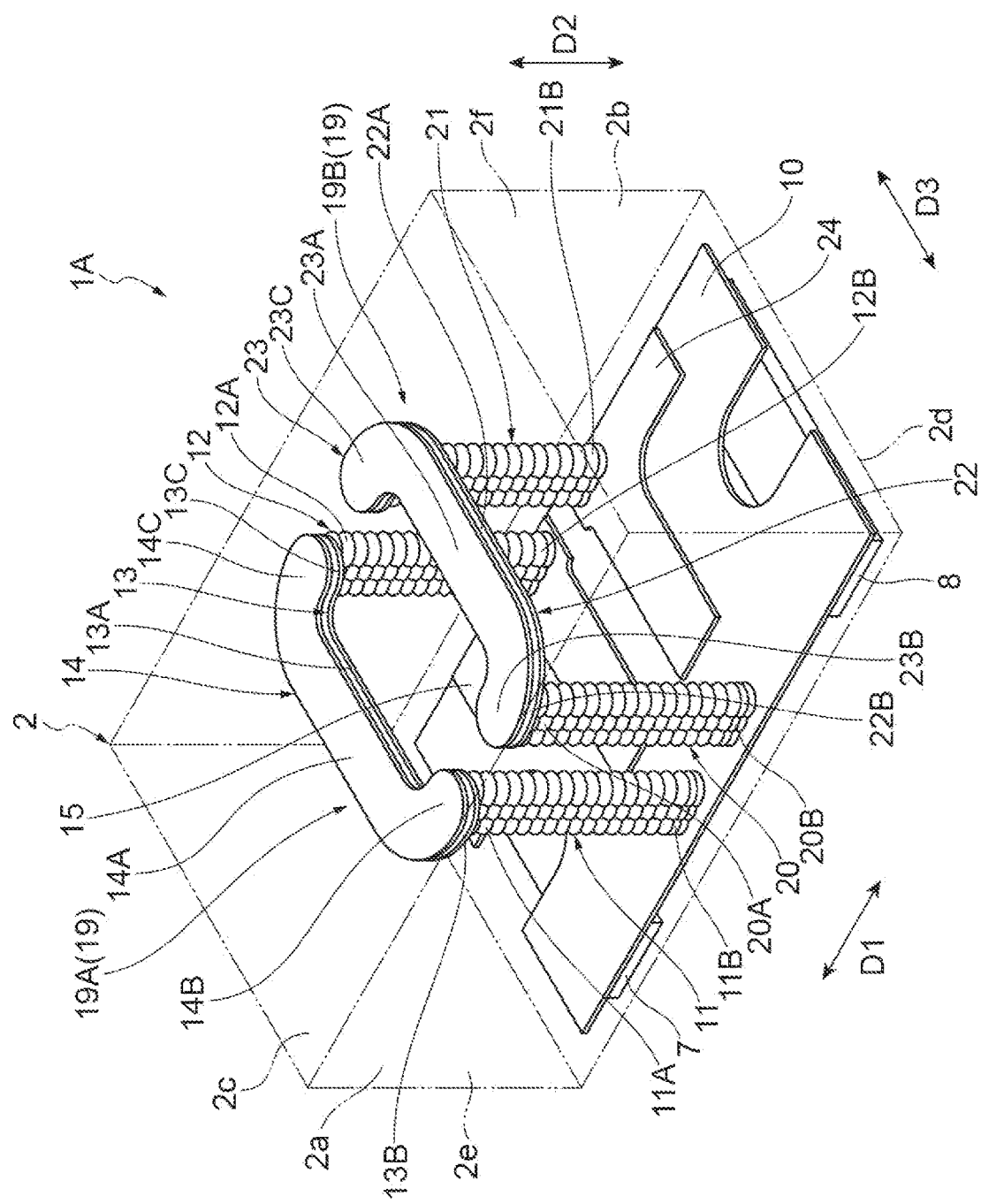
FIG. 8 is a transparent perspective view of an electronic component according to a second embodiment.
Figure 9:
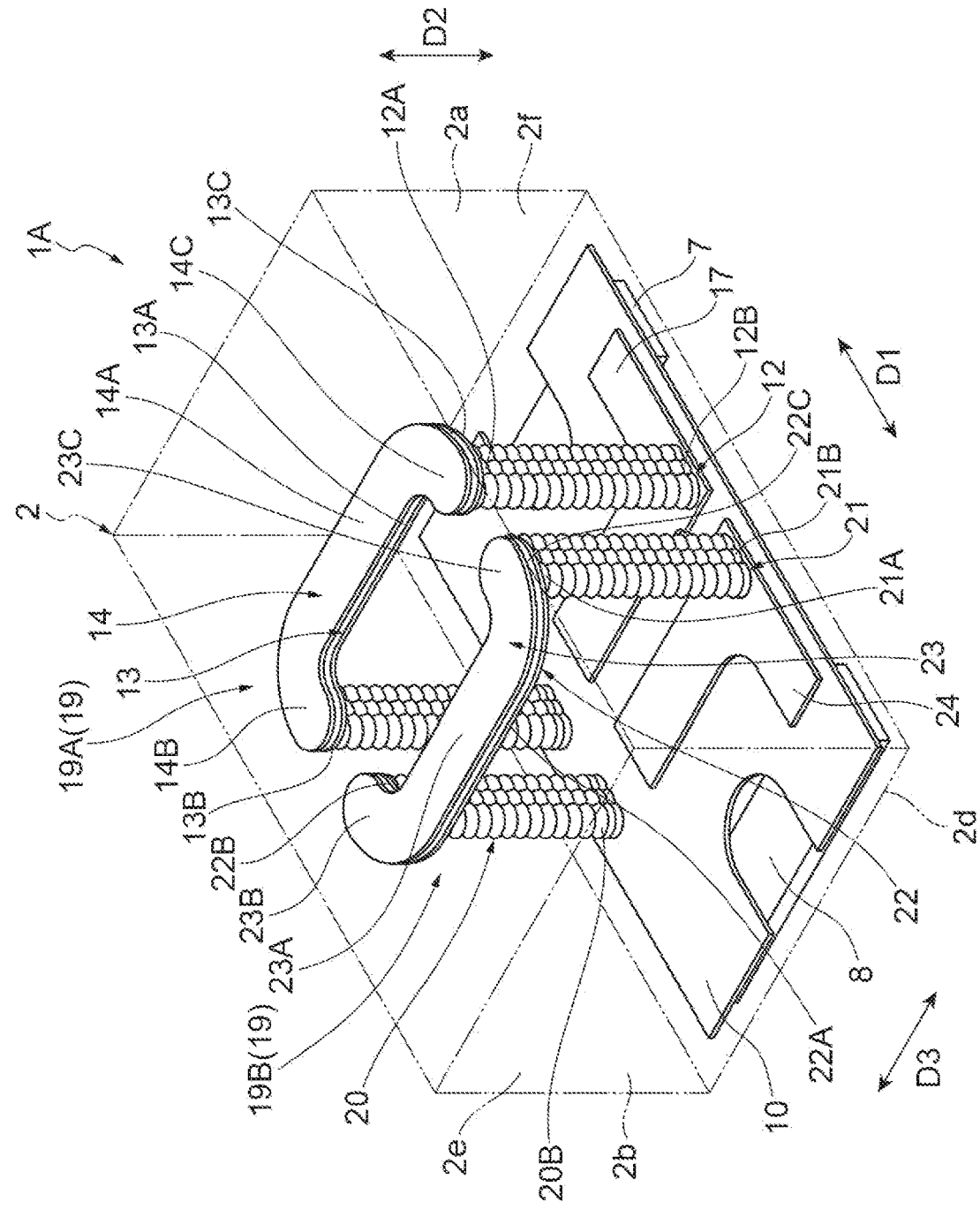
FIG. 9 is a transparent perspective view of the electronic component illustrated in FIG. 8.
Figure 10:
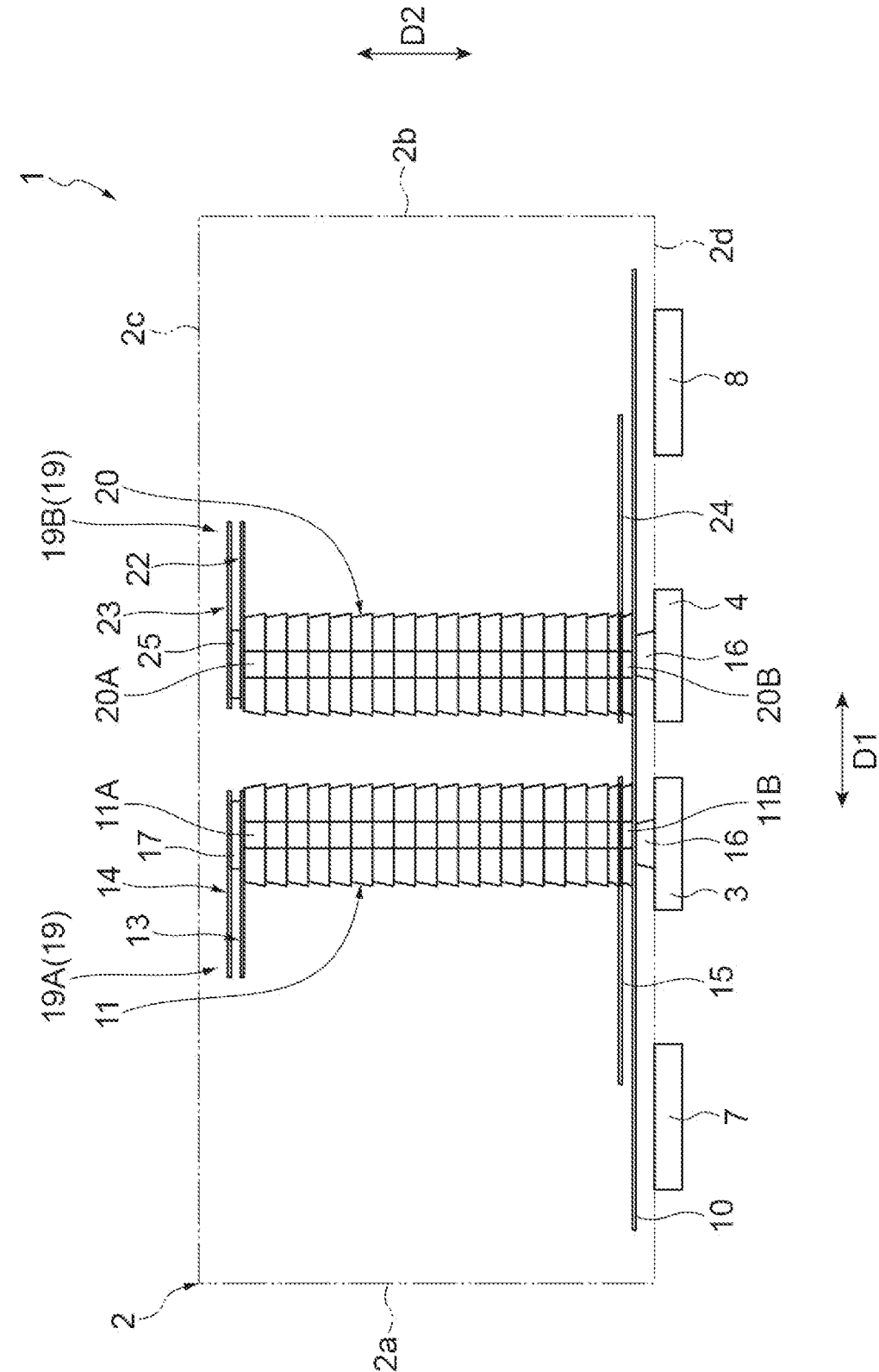
FIG. 10 is a side view of the electronic component illustrated in FIG. 8.
Figure 11:
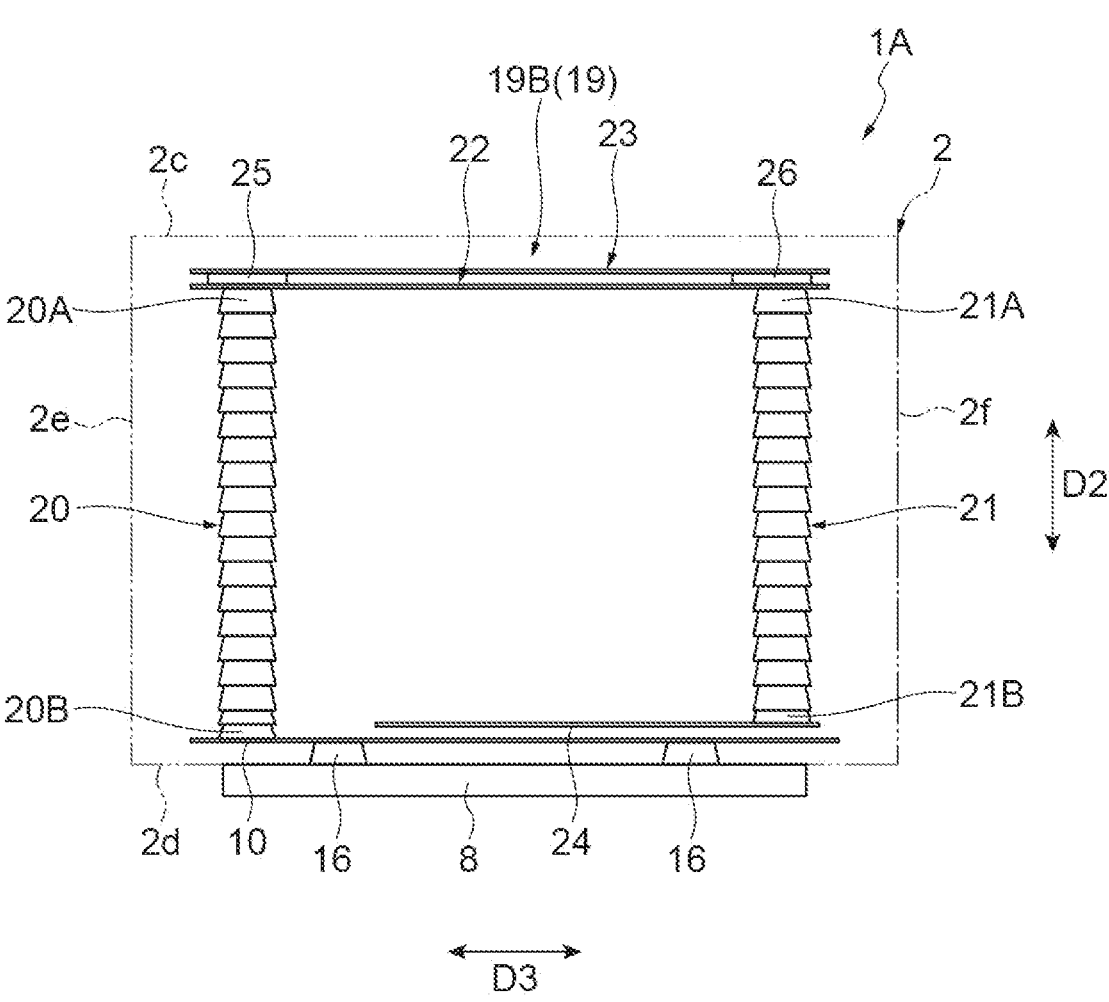
FIG. 11 is an end view of the electronic component illustrated in FIG. 8.
Figure 12:
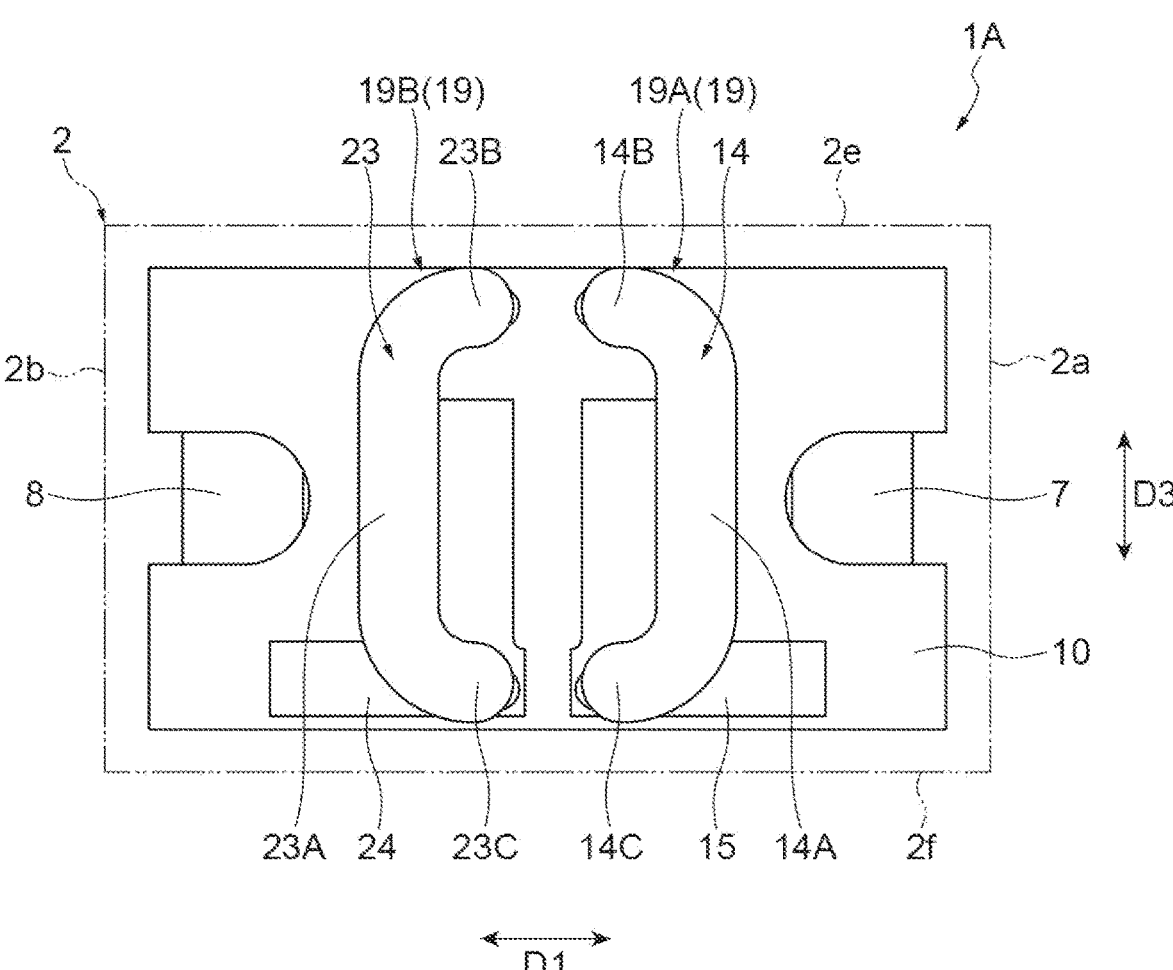
FIG. 12 is a top view of the electronic component illustrated in FIG. 8.

Next, an electronic component according to a second embodiment will be described with reference to FIGS. 8, 9, 10, 11, and 12. FIG. 8 is a transparent perspective view of the electronic component according to the second embodiment. FIG. 9 is a transparent perspective view of the electronic component illustrated in FIG. 8. FIG. 10 is a side view of the electronic component illustrated in FIG. 8. FIG. 11 is an end view of the electronic component illustrated in FIG. 8. FIG. 12 is a top view of the electronic component illustrated in FIG. 8. As illustrated in FIGS. 8 to 12, an electronic component 1A includes an element body 2, a first terminal electrode 3, a second terminal electrode 4, a third terminal electrode 5, a fourth terminal electrode 6, a fifth terminal electrode 7, a sixth terminal electrode 8, and a resonator 19. In FIGS. 8 to 12, the element body 2 is indicated by a dashed dotted line.

The resonator 19 includes a ground conductor 10, a first conductor 11, a second conductor 12, a third conductor 20, a fourth conductor 21, an inductor conductor 13, an inductor conductor 14, an inductor conductor (connection conductor) 22, an inductor conductor (connection conductor) 23, a capacitor pad 15, and a capacitor pad 24.

The resonator 19 includes a first resonator 19A and a second resonator 19B. The first resonator 19A includes a first conductor 11, a second conductor 12, an inductor conductor 13, an inductor conductor 14, and a capacitor pad 15. The second resonator 19B includes a third conductor 20, a fourth conductor 21, an inductor conductor 22, an inductor conductor 23, and a capacitor pad 24.

The third conductor 20 extends along a second direction D2. The third conductor 20 can include a plurality of via conductors. The third conductor 20 is disposed at a position close to a side surface 2e of the element body 2 at a position close to a center of the element body 2 in a first direction D1. The third conductor 20 is disposed at a position overlapping the second terminal electrode 4 as viewed from the second direction D2. The third conductor 20 is disposed close to an end surface 2b of the element body 2 than the first conductor 11. That is, the first conductor 11 is disposed close to an end surface 2a side of the element body 2 than the third conductor 20. The third conductor 20 is disposed at a position facing the first conductor 11 in the first direction D1. The third conductor 20 and the first conductor 11 are disposed apart from each other in the first direction D1.

The third conductor 20 has a first end portion 20A and a second end portion 20B. The first end portion 20A of the third conductor 20 is connected to the inductor conductor 22. The second end portion 20B of the third conductor 20 is connected to the ground conductor 10.

The fourth conductor 21 extends along the second direction D2. The fourth conductor 21 can include a plurality of via conductors. The fourth conductor 21 is disposed at a position close to a side surface 2f of the element body 2 at a position close to the center of the element body 2 in the first direction D1. The fourth conductor 21 is disposed at a position overlapping the fourth terminal electrode 6 as viewed from the second direction D2. The fourth conductor 21 is disposed close to the end surface 2b side of the element body 2 than the second conductor 12. That is, the second conductor 12 is disposed close to the end surface 2a side of the element body 2 than the fourth conductor 21. The fourth conductor 21 is disposed at a position facing the second conductor 12 in the first direction D1. The fourth conductor 21 and the second conductor 12 are disposed apart from each other in the first direction D1. The fourth conductor 21 is disposed at a position facing the third conductor 20 in a third direction D3. The fourth conductor 21 and the third conductor 20 are disposed apart from each other in the third direction D3.

The fourth conductor 21 has a first end portion 21A and a second end portion 21B. The first end portion 21A of the fourth conductor 21 is connected to the inductor conductor 22. The second end portion 21B of the fourth conductor 21 is connected to the capacitor pad 24.

Figure 13:
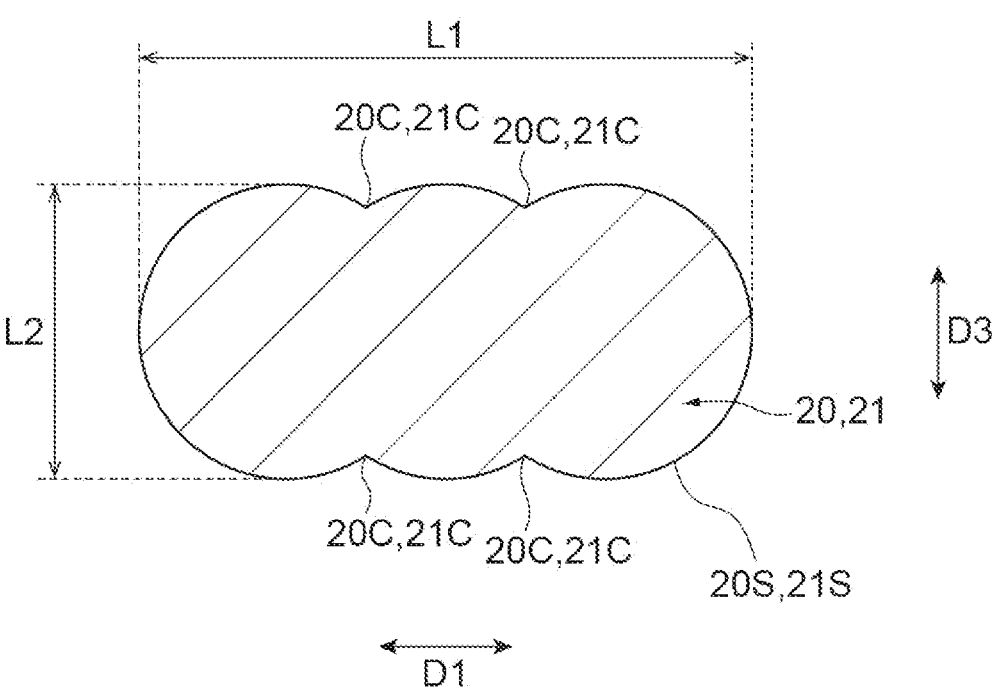
FIG. 13 is a diagram illustrating a cross-sectional configuration of a conductor.

FIG. 13 is a diagram illustrating cross-sectional configurations of the conductors (third conductor 20 and fourth conductor 21). Cross sections of the third conductor 20 and the fourth conductor 21 illustrated in FIG. 13 are cross sections of planes along the first direction D1 and the third direction D3. As illustrated in FIG. 13, the third conductor 20 and the fourth conductor 21 have the same shape. In the third conductor 20 and the fourth conductor 21, as viewed from the second direction D2, a first length L1 in the first direction D1 is longer than a second length L2 in the third direction D3 (L1>L2). The third conductor 20 and the fourth conductor 21 are disposed such that the first length L1 is along the first direction D1 and the second length L2 is along the third direction D3. That is, an extending direction of the third conductor 20 and the fourth conductor 21 is orthogonal to a direction (third direction D3) in which the third conductor 20 and the fourth conductor 21 are arranged. A case where the extending direction is orthogonal to the direction includes a case where the extending direction is substantially orthogonal to the direction, and may include, for example, a range of about ±3°.

The third conductor 20 and the fourth conductor 21 have a shape in which three circles overlap each other. Specifically, the third conductor 20 and the fourth conductor 21 have a shape in which parts of a pair of adjacent circles overlap. For example, two adjacent circles overlap each other such that an outer periphery of one circle passes through a center of the other circle. Side surfaces 20S and 21S of the third conductor 20 and the fourth conductor 21 are curved surfaces. A plurality of recesses 20C and 21C are provided in the side surfaces 20S and 21S of the third conductor 20 and the fourth conductor 21. The recesses 20C and 21C extend in the second direction D2. The recesses 20C and 21C are disposed at a predetermined interval in the first direction D1. The recesses 20C and 21C are disposed at positions facing each other in the third direction D3.

As illustrated in FIGS. 8 to 12, the inductor conductor 22 constitutes an inductor. In the present embodiment, as illustrated in FIGS. 8 and 9, the inductor conductor 22 includes a first portion 22A, a second portion 22B, and a third portion 22C. The first portion 22A, the second portion 22B, and the third portion 22C are integrally formed. The first portion 22A, the second portion 22B, and the third portion 22C have a predetermined width.

The first portion 22A extends linearly along the second direction D2. The second portion 22B is connected to an end portion of the first portion 22A on the side surface 2e side. The second portion 22B is curved. The third portion 22C is connected to an end portion of the first portion 22A on the side surface 2f side. The third portion 22C is curved. The inductor conductor 22 is disposed line-symmetrically with the inductor conductor 13 as viewed from the second direction D2.

The inductor conductor 22 is bridged over the first end portion 20A of the third conductor 20 and the first end portion 21A of the fourth conductor 21. Specifically, the second portion 22B of the inductor conductor 22 is connected to the first end portion 20A of the third conductor 20, and the third portion 22C of the inductor conductor 22 is connected to the first end portion 21A of the fourth conductor 21. The inductor conductor 22 electrically connects the third conductor 20 and the fourth conductor 21.

The inductor conductor 23 constitutes an inductor. In the present embodiment, the inductor conductor 23 includes a first portion 23A, a second portion 23B, and a third portion 23C. The first portion 23A, the second portion 23B, and the third portion 23C are integrally formed. The first portion 14A, the second portion 23B, and the third portion 23C have a predetermined width.

The inductor conductor 23 has the same shape as the inductor conductor 22. The first portion 23A extends linearly along the second direction D2. The second portion 23B is connected to an end portion of the first portion 23A on the side surface 2e side. The second portion 23B is curved. The third portion 23C is connected to an end portion of the first portion 23A on the side surface 2f side. The inductor conductor 23 is disposed to face the inductor conductor 22 in the first direction D1. The inductor conductor 23 is disposed line-symmetrically with the inductor conductor 14 as viewed from the second direction D2.

The second portion 23B of the inductor conductor 23 is electrically connected to the second portion 22B of the inductor conductor 22 by a connection conductor 25. The third portion 23C of the inductor conductor 23 is electrically connected to the third portion 22C of the inductor conductor 22 by a connection conductor 26. The inductor conductor 23 electrically connects the third conductor 20 and the fourth conductor 21.

The capacitor pad 24 has a substantially L-shape as viewed from the second direction D2. The capacitor pad 24 constitutes a capacitor together with the ground conductor 10. The capacitor pad 24 is connected to the second end portion 21B of the fourth conductor 21. The capacitor pad 24 is disposed at a predetermined interval from the ground conductor 10 in the first direction D1. The capacitor pad 24 is disposed line-symmetrically with the capacitor pad 15 as viewed from the second direction D2.

As described above, in the electronic component 1A according to the present embodiment, the first length L1 of each of the first conductor 11, the second conductor 12, the third conductor 20, and the fourth conductor 21 in the first direction D1 is longer than the second length L2 in the third direction D3 as viewed from the second direction D2. In this configuration, since cross-sectional areas of the first conductor 11, the second conductor 12, the third conductor 20, and the fourth conductor 21 can be increased, resistance values of the first conductor 11, the second conductor 12, the third conductor 20, and the fourth conductor 21 can be reduced, and a Q value can be improved.

In the electronic component 1A, as viewed from the second direction D2, the third direction D3 in which the first conductor 11, the second conductor 12, the third conductor 20, and the fourth conductor 21 are arranged is orthogonal to the extending direction (first direction D1) of the first conductor 11, the second conductor 12, the third conductor 20, and the fourth conductor 21. As a result, in the electronic component 1A, even in a case where the cross-sectional areas of the first conductor 11, the second conductor 12, the third conductor 20, and the fourth conductor 21 are increased, a space formed by the first conductor 11, the second conductor 12, the inductor conductors 13 and 14, the third conductor 20 and the fourth conductor 21, and the inductor conductors 22 and 23 can be secured without increasing a size of the element body 2. Thus, in the electronic component 1A, a region where a magnetic flux is generated can be secured, and a magnetic field can be formed around the first conductor 11, the second conductor 12, the third conductor 20, and the fourth conductor 21. Accordingly, in the electronic component 1A, an apparent volume of the inductor including the first conductor 11, the second conductor 12, and the inductor conductors 13 and 14 and the apparent volume of the inductor including the third conductor 20, the fourth conductor 21, and the inductor conductors 22 and 23 can be increased, and the Q value can be improved. As described above, in the electronic component 1A, the Q value can be improved while the increase in the size of the element body 2 is suppressed.

In the electronic component 1A according to the present embodiment, the element body 2 has a pair of end surfaces 2a and 2b facing each other in the first direction D1, a pair of principal surfaces 2c and 2d facing each other in the second direction D2, and a pair of side surfaces 2e and 2f facing each other in the third direction D3. A length of the element body 2 in the first direction D1 is longer than a length in the second direction D2 and a length in the third direction D3. The first length L1 of the first conductor 11 and the second conductor 12 and the first length L1 of the third conductor 20 and the fourth conductor 21 are lengths in the first direction D1, and the second length L2 of the first conductor 11 and the second conductor 12 and the second length L2 of the third conductor 20 and the fourth conductor 21 are lengths in the third direction D3.

In this configuration, the first conductor 11, the second conductor 12, the third conductor 20, and the fourth conductor 21 are disposed in the element body 2 such that the extending direction of the first conductor 11, the second conductor 12, the third conductor 20, and the fourth conductor 21 is along a longitudinal direction (first direction D1) of the element body 2, and the inductor conductors 13, 14, 22, and 23 are disposed along a transversal direction (third direction D3) of the element body 2. Thus, in the electronic component 1A, a large number of (a plurality of) resonators 19 can be disposed in a limited space in the element body 2 as compared with a case where the first conductor 11, the second conductor 12, the third conductor 20, and the fourth conductor 21 are disposed such that the extending direction thereof is along the transversal direction (third direction D3) of the element body 2. Accordingly, in the above configuration of the electronic component 1A, in a case where the plurality of resonators 19 are disposed in the element body 2, the space in the element body 2 can be effectively used (space efficiency can be enhanced).

Third Embodiment

Figure 14:
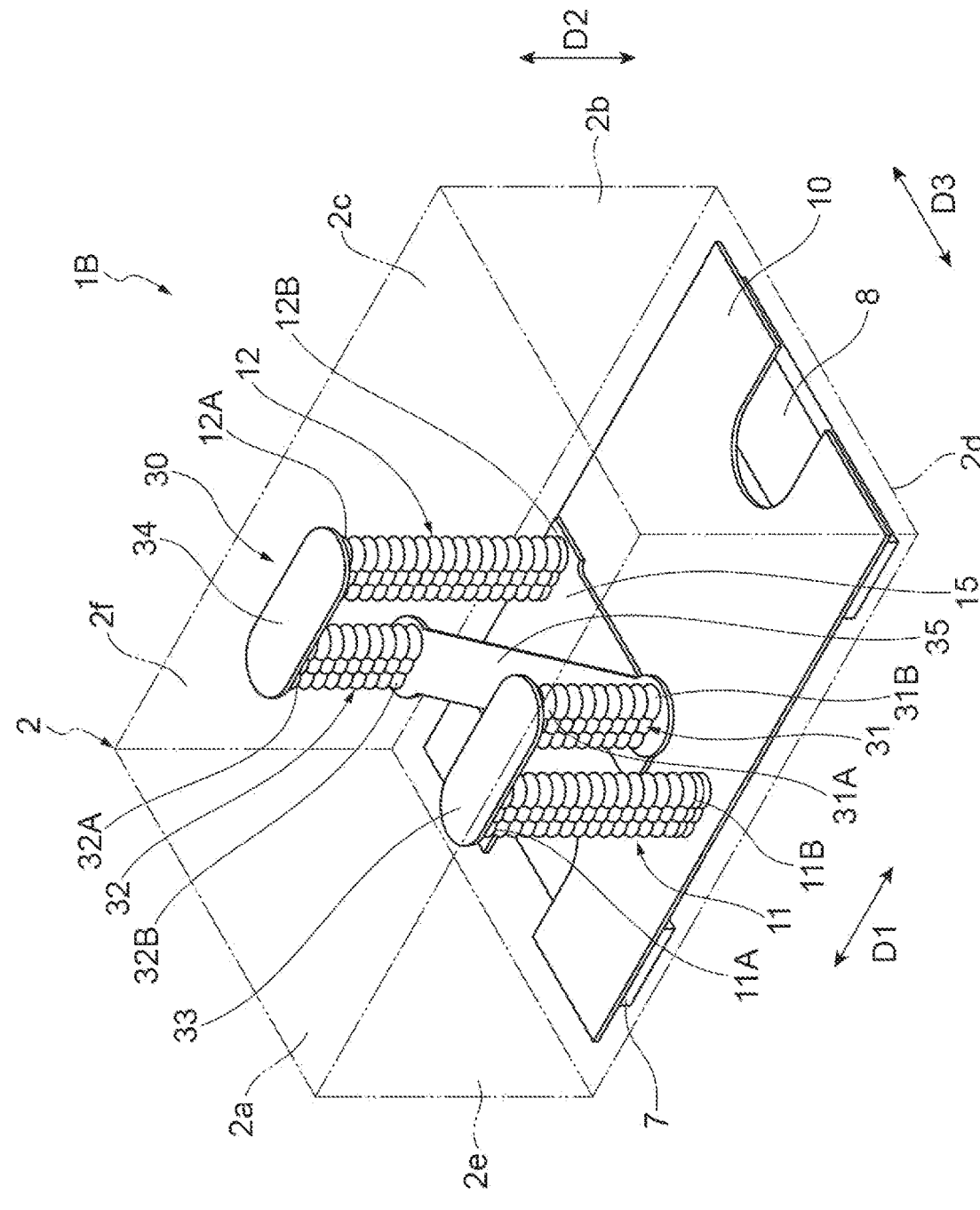
FIG. 14 is a transparent perspective view of an electronic component according to a third embodiment.
Figure 15:
FIG. 15 is a transparent perspective view of the electronic component illustrated in FIG. 14.
Figure 16:
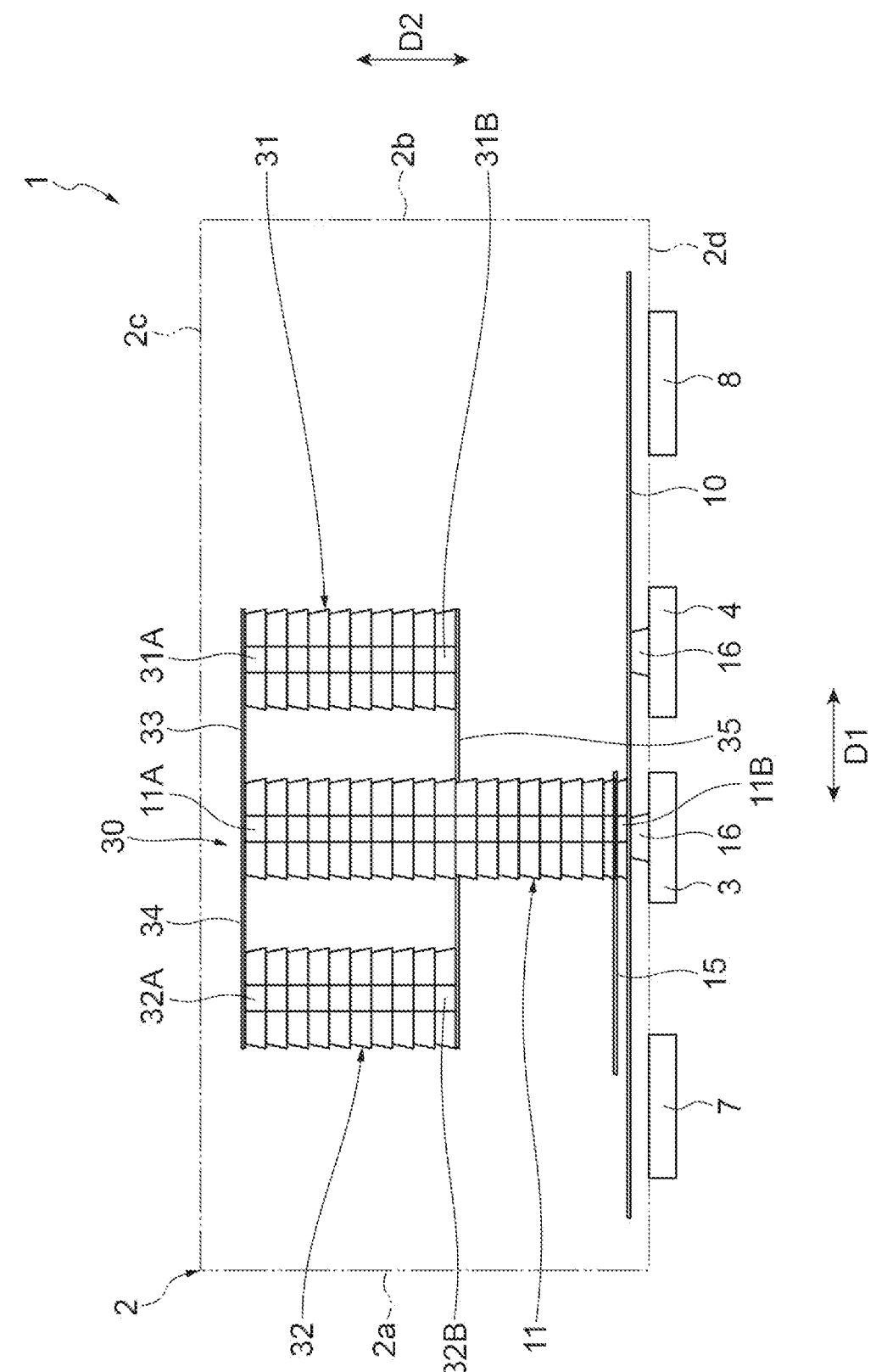
FIG. 16 is a side view of the electronic component illustrated in FIG. 14.
Figure 17:
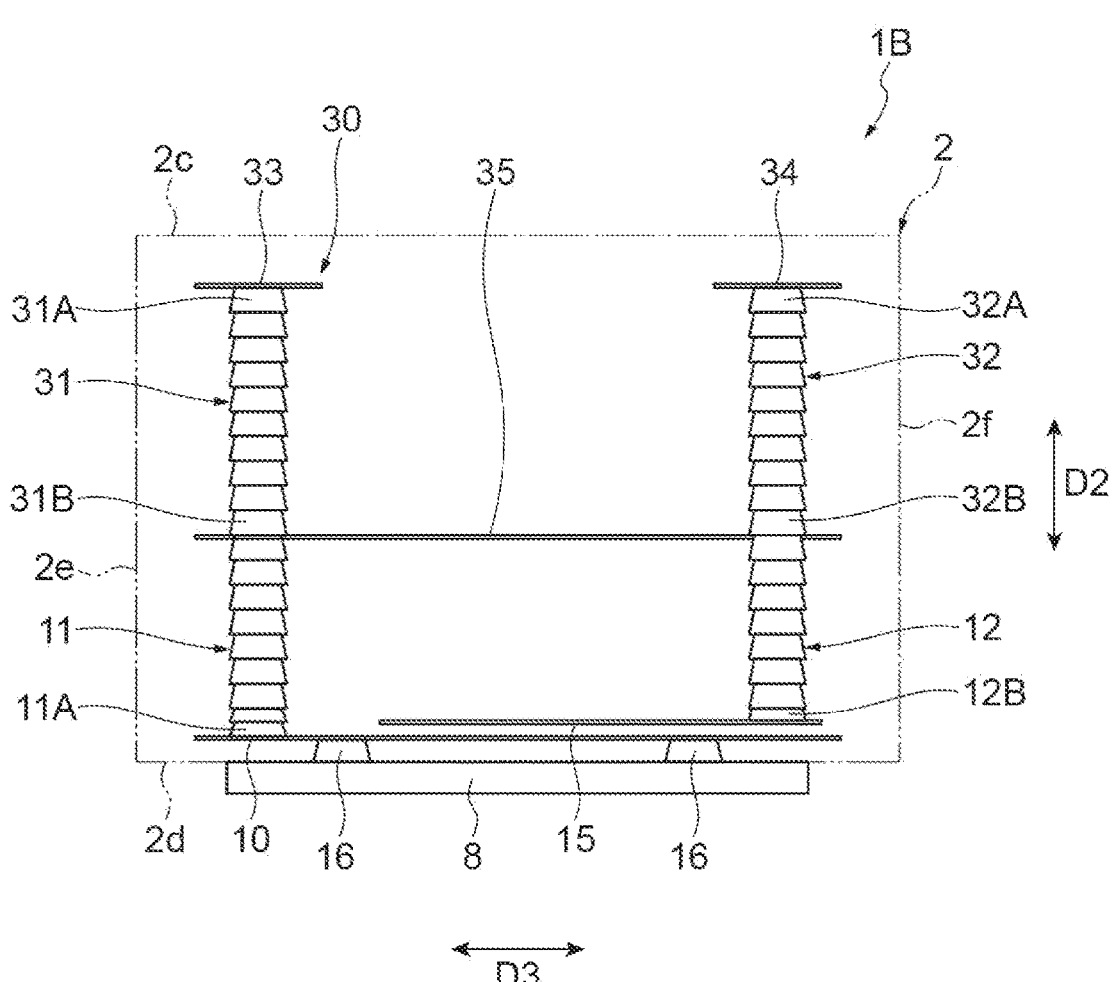
FIG. 17 is an end view of the electronic component illustrated in FIG. 14.
Figure 18:
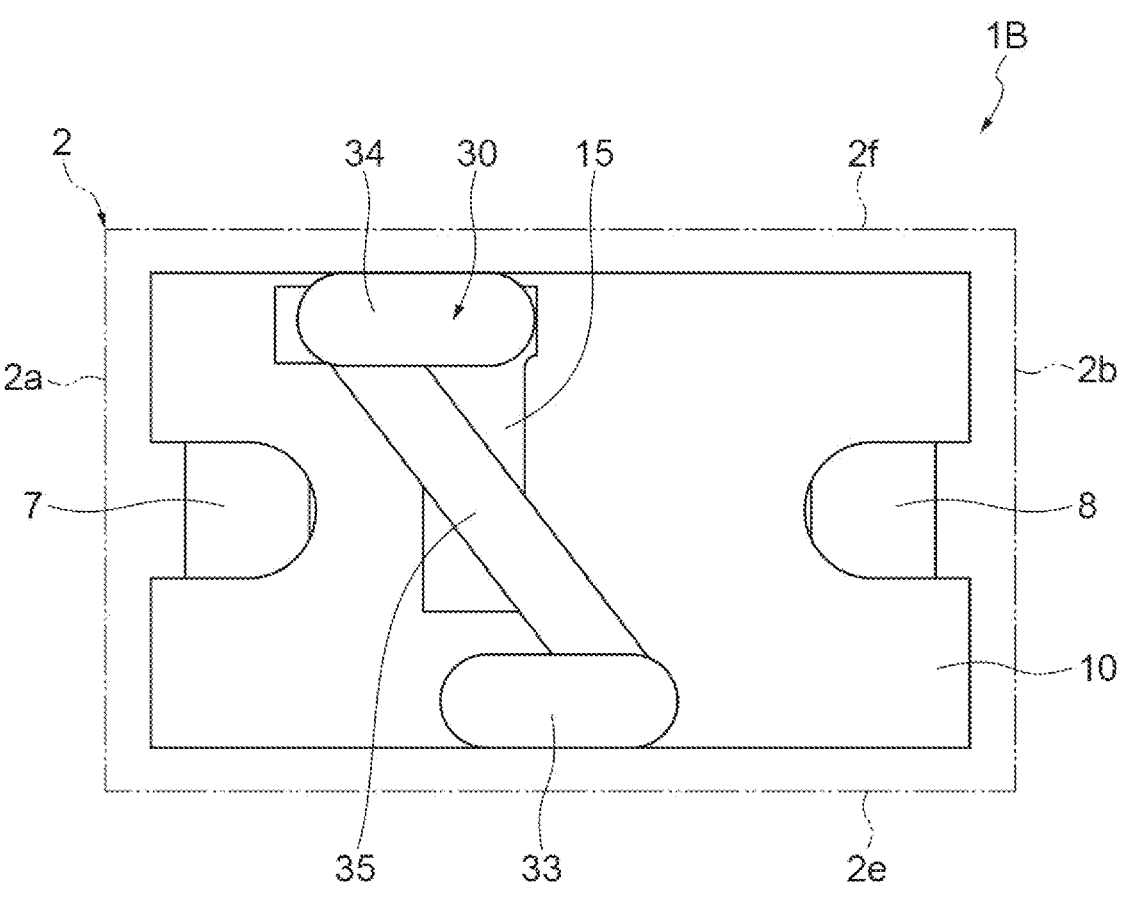
FIG. 18 is a top view of the electronic component illustrated in FIG. 14.

Next, an electronic component according to a third embodiment will be described with reference to FIGS. 14, 15, 16, 17, and 18. FIG. 14 is a transparent perspective view of the electronic component according to the third embodiment. FIG. 15 is a transparent perspective view of the electronic component illustrated in FIG. 14. FIG. 16 is a side view of the electronic component illustrated in FIG. 14. FIG. 17 is an end view of the electronic component illustrated in FIG. 14. FIG. 18 is a top view of the electronic component illustrated in FIG. 14. As illustrated in FIGS. 14 to 18, an electronic component 1B includes an element body 2, a first terminal electrode 3, a second terminal electrode 4, a third terminal electrode 5, a fourth terminal electrode 6, a fifth terminal electrode 7, and a sixth terminal electrode 8, and a resonator 30. In FIGS. 14 to 18, the element body 2 is indicated by a dashed dotted line.

The resonator 30 includes a ground conductor 10, a first conductor 11, a second conductor 12, a third conductor 31, a fourth conductor 32, an inductor conductor (connection conductor) 33, an inductor conductor (connection conductor) 34, an inductor conductor 35, and a capacitor pad 15.

A first end portion 11A of the first conductor 11 is connected to the inductor conductor 33. A second end portion 11B of the first conductor 11 is connected to the ground conductor 10. A first end portion 12A of the second conductor 12 is connected to the inductor conductor 34. A second end portion 12B of the second conductor 12 is connected to the capacitor pad 15.

The third conductor 31 extends along a second direction D2. The third conductor 20 can include a plurality of via conductors. The third conductor 20 is disposed at a position close to a side surface 2e of the element body 2 at a position close to a center of the element body 2 in a first direction D1.

The third conductor 31 is disposed closer to an end surface 2*b* of the element body 2 than the first conductor 11. That is, the first conductor 11 is disposed closer to an end surface 2*a* side of the element body 2 than the third conductor 31. The third conductor 31 is disposed at a position facing the first conductor 11 in the first direction D1. The third conductor 31 and the first conductor 11 are disposed apart from each other in the first direction D1.

The third conductor 31 has a first end portion 31A and a second end portion 31B. The first end portion 31A of the third conductor 31 is connected to the inductor conductor 33. The second end portion 31B of the third conductor 31 is connected to the inductor conductor 35.

The fourth conductor 32 extends along the second direction D2. The fourth conductor 32 can include a plurality of via conductors. The fourth conductor 32 is disposed at a position close to a side surface 2*f* of the element body 2 at a position close to the center of the element body 2 in the first direction D1. The fourth conductor 32 is disposed close to the end surface 2*b* side of the element body 2 than the second conductor 12. That is, the second conductor 12 is disposed close to the end surface 2*a* side of the element body 2 than the fourth conductor 32. The fourth conductor 32 is disposed at a position facing the second conductor 12 in the first direction D1. The fourth conductor 32 and the second conductor 12 are disposed apart from each other in the first direction D1. The fourth conductor 32 is disposed at a position facing the third conductor 31 in a third direction D3. The fourth conductor 32 and the third conductor 31 are disposed apart from each other in the third direction D3.

The fourth conductor 32 has a first end portion 32A and a second end portion 32B. The first end portion 32A of the fourth conductor 32 is connected to the inductor conductor 34. The second end portion 32B of the fourth conductor 32 is connected to the inductor conductor 35.

Figure 19:
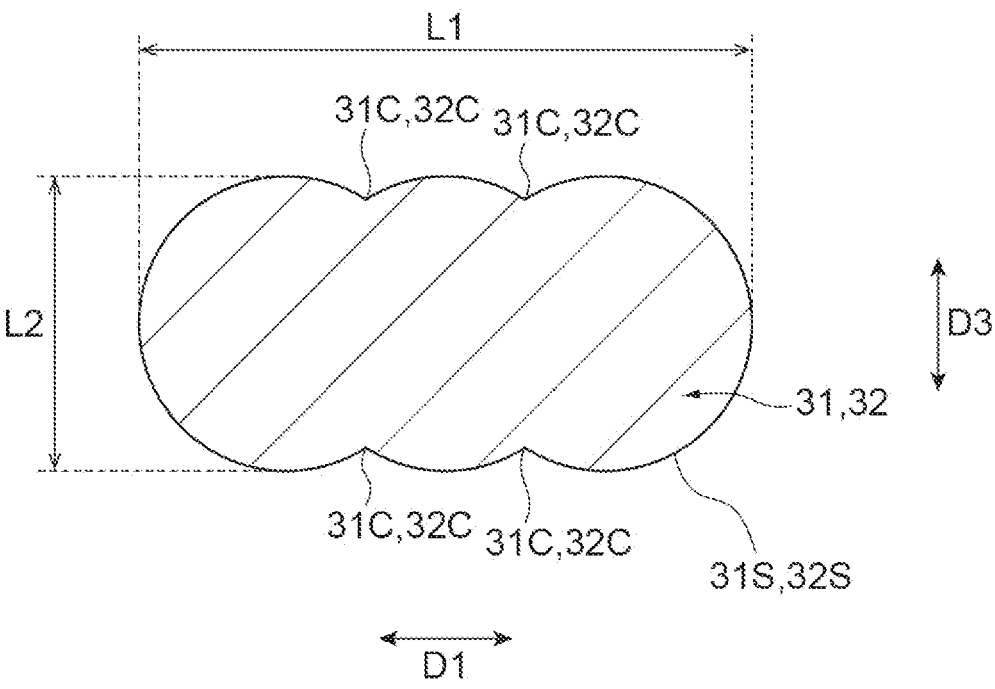
FIG. 19 is a diagram illustrating a cross-sectional configuration of a conductor.

FIG. 19 is a diagram illustrating cross-sectional configurations of conductors (third conductor 31 and fourth conductor 32). Cross sections of the third conductor 31 and the fourth conductor 32 illustrated in FIG. 19 are cross sections of planes along the first direction D1 and the third direction D3. As illustrated in FIG. 19, the third conductor 31 and the fourth conductor 32 have the same shape. In the third conductor 31 and the fourth conductor 32, as viewed from the second direction D2, a first length L1 in the first direction D1 is longer than a second length L2 in the third direction D3 (L1>L2). The third conductor 31 and the fourth conductor 32 are disposed such that the first length L1 is along the first direction D1 and the second length L2 is along the third direction D3. That is, an extending direction of the third conductor 31 and the fourth conductor 32 is orthogonal to a direction (third direction D3) in which the third conductor 31 and the fourth conductor 32 are arranged. A case where the extending direction is orthogonal to the direction includes a case where the extending direction is substantially orthogonal to the direction, and may include, for example, a range of about ±3°.

The third conductor 31 and the fourth conductor 32 have a shape in which three circles overlap each other. Specifically, the third conductor 31 and the fourth conductor 32 have a shape in which parts of a pair of adjacent circles overlap. For example, two adjacent circles overlap each other such that an outer periphery of one circle passes through a center of the other circle. Side surfaces 31S and 32S of the third conductor 31 and the fourth conductor 32 are curved surfaces. A plurality of recesses 31C and 32C are provided in the side surfaces 31S and 32S of the third conductor 31 and the fourth conductor 32. The recesses 31C and 32C extend in the second direction D2. The recesses 31C and 32C are disposed at a predetermined interval in the first direction D1. The recesses 31C and 32C are disposed at positions facing each other in the third direction D3.

As illustrated in FIGS. 14 to 18, the inductor conductor 33 constitutes an inductor. The inductor conductor 33 has a predetermined width. The inductor conductor 33 extends linearly along the first direction D1. The inductor conductor 33 is bridged over the first end portion 11A of the first conductor 11 and the first end portion 31A of the third conductor 31. The inductor conductor 33 electrically connects the first conductor 11 and the third conductor 31.

The inductor conductor 34 constitutes an inductor. The inductor conductor 34 has a predetermined width. The inductor conductor 34 has the same shape as the inductor conductor 33. The inductor conductor 34 extends linearly along the first direction D1. The inductor conductor 34 is bridged over the first end portion 12A of the second conductor 12 and the first end portion 32A of the fourth conductor 32. The inductor conductor 34 electrically connects the second conductor 12 and the fourth conductor 32.

The inductor conductor 35 constitutes an inductor. The inductor conductor 35 has a predetermined width. The inductor conductor 35 extends linearly. The inductor conductor 35 is disposed over the second end portion 31B of the third conductor 31 and the second end portion 32B of the fourth conductor 32. The inductor conductor 35 electrically connects the third conductor 31 and the fourth conductor 32.

As described above, in the electronic component 1B according to the present embodiment, the first length L1 of each of the first conductor 11, the second conductor 12, the third conductor 31, and the fourth conductor 32 in the first direction D1 is longer than the second length L2 in the third direction D3 as viewed from the second direction D2. In this configuration, since cross-sectional areas of the first conductor 11, the second conductor 12, the third conductor 31, and the fourth conductor 32 can be increased, resistance values of the first conductor 11, the second conductor 12, the third conductor 31, and the fourth conductor 32 can be reduced, and a Q value can be improved.

In the electronic component 1B, as viewed from the second direction D2, the third direction D3 in which the first conductor 11, the second conductor 12, the third conductor 31, and the fourth conductor 32 are arranged is orthogonal to the extending direction (first direction D1) of the first conductor 11, the second conductor 12, the third conductor 31, and the fourth conductor 32. As a result, in the electronic component 1B, even in a case where the cross-sectional areas of the first conductor 11, the second conductor 12, the third conductor 31, and the fourth conductor 32 are increased, a space formed by the first conductor 11, the second conductor 12, the third conductor 31, the fourth conductor 32, and the inductor conductors 33, 34, and 35 can be secured without increasing a size of the element body 2. Thus, in the electronic component 1B, a region where a magnetic flux is generated can be secured, and a magnetic field can be formed around the first conductor 11, the second conductor 12, the third conductor 31, and the fourth conductor 32. Accordingly, in the electronic component 1B, an apparent volume of the inductor including the first conductor 11, the second conductor 12, the third conductor 31, the fourth conductor 32, and the inductor conductors 33, 34, and 35 can be increased, and the Q value can be improved. As described above, in the electronic component 1B, the Q value can be improved while the increase in the size of the element body 2 is suppressed.

In the electronic component 1B according to the present embodiment, the resonator 30 is connected to the plurality of inductor conductors 33, 34, and 35. As described above, in the resonator 30, an inductance can be adjusted by increasing or decreasing the plurality of inductor conductors.

Although the embodiments of the present disclosure have been described above, the present disclosure is not necessarily limited to the above-described embodiments, and various modifications can be made without departing from the gist thereof.

In the first embodiment, a mode in which the first length L1 of each of the first conductor 11 and the second conductor 12 in the first direction D1 is longer than the second length L2 in the third direction D3 (L1>L2) as viewed from the second direction D2 has been described as an example. However, when at least one of the first conductor 11 and the second conductor 12 is viewed from the second direction D2, the first length L1 in the first direction D1 may be longer than the second length L2 in the third direction D3. The same applies to the third conductor 20 and the fourth conductor 21 of the second embodiment, and the third conductor 31 and the fourth conductor 32 of the third embodiment.

In the above embodiment, a mode in which the first conductor 11, the second conductor 12, the third conductors 20 and 31, and the fourth conductors 21 and 32 have a shape in which three circles overlap and have the recesses 11C, 12C, 20C, 21C, 31C, and 32C has been described as an example. However, the shapes of the first conductor 11, the second conductor 12, the third conductors 20 and 31, and the fourth conductors 21 and 32 are not limited thereto. The first conductor 11, the second conductor 12, the third conductors 20 and 31, and the fourth conductors 21 and 32 may have, for example, a rectangular shape, an elliptical shape, or the like.

What is claimed is:

1. An electronic component comprising:
an element body formed by stacking a plurality of insulating layers; and
a resonator disposed in the element body, the resonator comprising:

two conductors extending vertically in a stacking direction of the plurality of insulating layers, and
a connection conductor electrically connecting upper surfaces of the two conductors, the connection conductor extending horizontally with respect to the stacking direction,
wherein in at least one conductor of the two conductors, when the at least one conductor is viewed from the stacking direction, a first length in one direction is longer than a second length in an other direction orthogonal to the one direction, and
as viewed from the stacking direction, a direction in which the two conductors are arranged and the one direction are orthogonal.

2. The electronic component according to claim 1, wherein
a plurality of recesses are provided in a side surface of the at least one conductor, and
the plurality of recesses are disposed to face in the other direction, and extend in the stacking direction.

3. The electronic component according to claim 1, wherein in each of the two conductors, the first length is longer than the second length.

4. The electronic component according to claim 1, wherein
the element body has
a pair of end surfaces facing each other in a first direction,
a pair of principal surfaces facing each other in a second direction, and
a pair of side surfaces facing each other in a third direction,
wherein a length of the element body in the first direction is longer than a length in the second direction and a length in the third direction,
the first length of the at least one conductor is a length in the first direction, and
the second length of the at least one conductor is a length in the third direction.

5. The electronic component according to claim 1, wherein a plurality of the connection conductors are connected between the two conductors.

* * * * *